United States Patent
Yamanaka et al.

(10) Patent No.: US 11,021,806 B2
(45) Date of Patent: Jun. 1, 2021

(54) SN-PLATED STEEL SHEET AND METHOD FOR MANUFACTURING SN-PLATED STEEL SHEET

(71) Applicant: NIPPON STEEL CORPORATION, Tokyo (JP)

(72) Inventors: Shintaro Yamanaka, Tokyo (JP); Shigeru Hirano, Tokyo (JP); Masakazu Noda, Tokyo (JP); Yasuhiko Sato, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/603,496

(22) PCT Filed: Apr. 13, 2018

(86) PCT No.: PCT/JP2018/015489
§ 371 (c)(1),
(2) Date: Oct. 7, 2019

(87) PCT Pub. No.: WO2018/190412
PCT Pub. Date: Oct. 18, 2018

(65) Prior Publication Data
US 2020/0040479 A1 Feb. 6, 2020

(30) Foreign Application Priority Data
Apr. 13, 2017 (JP) .............................. JP2017-079792

(51) Int. Cl.
*C25D 11/02* (2006.01)
*C25D 11/26* (2006.01)
(Continued)

(52) U.S. Cl.
CPC ............ *C25D 11/26* (2013.01); *B32B 15/043* (2013.01); *B32B 15/18* (2013.01); *C23C 2/08* (2013.01); *C23C 28/322* (2013.01); *C23C 28/3455* (2013.01); *C25D 5/36* (2013.01); *C25D 9/10* (2013.01); *C25D 11/34* (2013.01); *Y10T 428/1259* (2015.01)

(58) Field of Classification Search
None
See application file for complete search history.

(56) References Cited

U.S. PATENT DOCUMENTS

2011/0300402 A1* 12/2011 Tachiki ................... C25D 9/10
428/610
2013/0029176 A1 1/2013 Kadowaki et al.
2017/0342585 A1* 11/2017 Goto ........................ C25D 9/10

FOREIGN PATENT DOCUMENTS

JP 63-290292 A 11/1988
JP 2004-60052 A 2/2004
(Continued)

OTHER PUBLICATIONS

"Methods of colour measurement—Reflecting and transmitting objects", JIS Z 8722, 2009, total 226 pages.
(Continued)

*Primary Examiner* — Seth Dumbris
(74) *Attorney, Agent, or Firm* — Birch, Stewart, Kolasch & Birch, LLP

(57) ABSTRACT

A Sn-plated steel sheet according to the present invention includes a steel sheet, a Sn-plated layer that is provided on at least one surface of the steel sheet, and a film that is provided on a surface of the Sn-plated layer and includes zirconium oxide and tin oxide, in which an amount of the zirconium oxide in the film is 0.2 mg/m$^2$ to 50 mg/m$^2$ in terms of metal Zr amount, in a depth direction analysis by X-ray photoelectron spectroscopy, a depth position A at which an element concentration of Zr present as the zirconium oxide is maximum is positioned closer to a surface of (Continued)

the film than a depth position B at which an element concentration of Sn present as the tin oxide is maximum, and a distance between the depth position A and the depth position B in a depth direction is 0.5 nm or more.

4 Claims, 2 Drawing Sheets

(51) Int. Cl.
    *B32B 15/04* (2006.01)
    *B32B 15/18* (2006.01)
    *C23C 2/08* (2006.01)
    *C23C 28/00* (2006.01)
    *C25D 5/36* (2006.01)
    *C25D 9/10* (2006.01)
    *C25D 11/34* (2006.01)

(56) References Cited

FOREIGN PATENT DOCUMENTS

| | | |
|---|---|---|
| JP | 2007-284789 A | 11/2007 |
| JP | 2010-13728 A | 1/2010 |
| JP | 2011-174172 A | 9/2011 |
| TW | 200925321 A1 | 6/2009 |
| TW | 201634748 A | 10/2016 |
| WO | WO 2008/123632 | 10/2008 |
| WO | WO 2016/076073 A1 | 5/2016 |
| WO | WO 2016/111349 A1 | 7/2016 |
| WO | WO-2016111349 A1 * | 7/2016 ............. B32B 15/02 |

OTHER PUBLICATIONS

"Tinplate and blackplate", JIS G 3303, 2008, total 37 pages.
International Search Report for PCT/JP2018/015489 dated Jun. 26, 2018.
Office Action for TW 107112750 dated Dec. 6, 2018.
Taniguchi, "State-of-the-Art Plating Technology: Observation of Mechanisms and Quality Improvement (by Process, Type and Use)", First Printing, Johokiko Co., Ltd., May 18, 2006, p. 11, total 2 pages.
Written Opinion of the International Searching Authority for PCT/JP2018/015489 (PCT/ISA/237) dated Jun. 26, 2018.
Indian Office Action dated Feb. 24, 2020, issued in Indian Patent Application No. 201917041708.

* cited by examiner

SN-PLATED STEEL SHEET AND METHOD FOR MANUFACTURING SN-PLATED STEEL SHEET

TECHNICAL FIELD OF THE INVENTION

The present invention relates to a Sn-plated steel sheet and a method for manufacturing a Sn-plated steel sheet.

The present application claims priority based on Japanese Patent Application No. 2017-79792 filed in Japan on Apr. 13, 2017, the disclosures of which are incorporated herein by reference in their entirety.

RELATED ART

A tin (Sn)-plated steel sheet is well known as a "tinplate" and is widely used for can applications such as beverage cans and food cans. This is because Sn is safe for the human body and is a beautiful metal. Such a Sn-plated steel sheet is mainly manufactured by an electro plating method. This is because the electro plating method is advantageous over a hot dip plating method because the amount of Sn, a relatively expensive metal, that is used can be controlled to the minimum required amount. Beautiful metallic gloss is imparted to a Sn-plated steel sheet after plating or by a heating and melting treatment after plating, and then by a chromate treatment such as an electrolytic treatment or an immersion treatment using a solution of hexavalent chromate, a chromate film is applied on the Sn plating in many cases. The effect of this chromate film is to prevent yellowing of the external appearance by suppressing oxidation of the Sn plating surface, to prevent the deterioration of the coating film adhesion due to the cohesion fracture of tin oxide in use after application, to improve the sulfide staining resistance, and the like.

On the other hand, in recent years, due to heightened awareness of the environment and safety, it has been required not only that the final product not include hexavalent chromium, but also that a chromate treatment itself not be performed. However, as described above, in the Sn-plated steel sheet having no chromate film, the external appearance thereof yellows due to the growth of tin oxide or the coating film adhesion is reduced. In addition, the sulfide staining resistance deteriorates.

Therefore, several Sn-plated steel sheets that are subjected to a coating treatment to replace the chromate film have been proposed.

For example, Patent Document 1 proposes a Sn-plated steel sheet in which a film including P and Si is formed by a treatment using a solution containing phosphate ions and a silane coupling agent. Patent Document 2 proposes a Sn-plated steel sheet in which a film including a reaction product of Al and P, at least one of Ni, Co, or Cu, and a silane coupling agent is formed by a treatment using a solution including aluminum phosphate.

Patent Document 3 proposes a method for manufacturing a Sn-plated steel sheet having no chromate film, which is subjected to a heat treatment until only a Zn-plated layer disappears after Zn plating is performed on Sn plating. Patent Document 4 and Patent Document 5 propose steel sheets for containers having a chemical conversion film including zirconium, phosphoric acid, a phenol resin and the like.

PRIOR ART DOCUMENT

Patent Document

[Patent Document 1] Japanese Unexamined Patent Application, First Publication No. 2004-60052

[Patent Document 2] Japanese Unexamined Patent Application, First Publication No. 2011-174172

[Patent Document 3] Japanese Unexamined Patent Application, First Publication No. S63-290292

[Patent Document 4] Japanese Unexamined Patent Application, First Publication No. 2007-284789

[Patent Document 5] Japanese Unexamined Patent Application, First Publication No. 2010-13728

DISCLOSURE OF THE INVENTION

Problems to be Solved by the Invention

The manufactured Sn-plated steel sheet is then subjected to a sterilization treatment, coating baking, and the like before a can is filled with contents after the can is made, but at this time, the Sn-plated steel sheet is heated. However, in the Sn-plated steel sheets and the manufacturing method thereof proposed in Patent Documents 1 to 5, there is a problem that when the Sn-plated steel sheet is heated, a part of the Sn-plated steel sheet is discolored.

Here, the present invention has been made in view of the above problem, and an object of the present invention is to provide a Sn-plated steel sheet that has excellent discoloration resistance at the time of heating without performing a chromate treatment of the related art, and a method for manufacturing a Sn-plated steel sheet.

Means for Solving the Problem

In order to solve the above-mentioned problem, as a result of intensive investigations by the present inventors, the present inventors have found that in a Sn-plated steel sheet having a film including zirconium oxide and tin oxide on a surface of the Sn-plated steel sheet, by setting a position at which an element concentration of zirconium oxide is maximum to be closer to a surface of the film than a position at which the element concentration of Sn present as tin oxide is maximum in a depth direction analysis by X-ray photoelectron spectroscopy, it is possible to realize a Sn-plated steel sheet which has excellent discoloration resistance after heating without performing a chromate treatment.

The summary of the present invention completed based on the above findings is as follows.

(1) According to an aspect of the present invention, there is provided a Sn-plated steel sheet including: a steel sheet; a Sn-plated layer that is provided on at least one surface of the steel sheet; and a film that is provided on a surface of the Sn-plated layer and includes zirconium oxide and tin oxide, in which an amount of the zirconium oxide in the film is 0.2 mg/m$^2$ to 50 mg/m$^2$ in terms of metal Zr amount, in a depth direction analysis by X-ray photoelectron spectroscopy, a depth position A at which an element concentration of Zr present as the zirconium oxide is maximum is positioned closer to a surface of the film than a depth position B at which an element concentration of Sn present as the tin oxide is maximum, and a distance between the depth position A and the depth position B in a depth direction is 0.5 nm or more.

(2) In the Sn-plated steel sheet according to (1), in the depth direction element analysis by the X-ray photoelectron spectroscopy, the element concentration of Zr present as the zirconium oxide at the depth position A may be 20% or more.

(3) In the Sn-plated steel sheet according to (1) or (2), the film may further include a phosphate compound, and in the film, a value α/β obtained by dividing an amount α (unit:

mg/m²) of the phosphate compound in terms of P amount by an amount β (unit: mg/m²) of the zirconium oxide in terms of metal Zr amount may be 0.2 to 2.0.

(4) In the Sn-plated steel sheet according to any one aspect of (1) to (3), when a depth position of the film 1/3 of a thickness from the surface of the film is set as a depth position C, the depth position A may be positioned closer to the surface than the depth position C.

(5) According to another aspect of the present invention, there is provided a method for manufacturing a Sn-plated steel sheet including: a step of performing a cathodic electrolytic treatment on a Sn-plated steel sheet having a Sn-plated layer formed on at least one surface of a steel sheet in a solution including zirconium ions to form a zirconium oxide on the Sn-plated layer; a step of performing a cleaning treatment by an immersion treatment or a spray treatment with warm water at 25° C. or higher for 0.3 seconds or longer after the cathodic electrolytic treatment; and a step of performing an anodic electrolytic treatment in an electrolyte solution having a Zr ion concentration of 270 ppm or less after the cleaning treatment to form a film including the zirconium oxide and tin oxide on the Sn-plated layer.

(6) In the method for manufacturing a Sn-plated steel sheet according to (5), an amount of the zirconium oxide in the film may be 0.2 mg/m² to 50 mg/m² in terms of metal Zr amount, in a depth direction analysis of the film by X-ray photoelectron spectroscopy, a depth position A at which an element concentration of Zr present as the zirconium oxide is maximum may be positioned closer to a surface of the film than a depth position B at which an element concentration of Sn present as the tin oxide is maximum, and a distance between the depth position A and the depth position B in a depth direction may be 0.5 nm or more.

(7) In the method for manufacturing a Sn-plated steel sheet according to (5) or (6), in a depth direction element analysis of the film by X-ray photoelectron spectroscopy, an element concentration of Zr present as the zirconium oxide at a depth position A may be 20% or more.

(8) In the method for manufacturing a Sn-plated steel sheet according to any one aspect of (5) to (7), the film may further include a phosphate compound, and in the film, a value α/β obtained by dividing an amount α (unit: mg/m²) of the phosphate compound in terms of P amount by an amount β (unit: mg/m²) of the zirconium oxide in terms of metal Zr amount may be 0.2 to 2.0.

Effects of the Invention

According to each aspect, it is possible to provide a Sn-plated steel sheet that has excellent discoloration resistance at the time of heating without performing a chromate treatment, and a method for manufacturing a Sn-plated steel sheet.

EMBODIMENTS OF THE INVENTION

Preferable embodiments of the present invention will be described in detail with reference to the accompanying drawings.

The present invention described below relates to a Sn-plated steel sheet widely used for cans such as food cans and beverage cans, and a method for manufacturing the Sn-plated steel sheet. More specifically, the present invention relates to a Sn-plated steel sheet with excellent discoloration resistance after heating and on which a chromate treatment of the related art is not performed, and a method for manufacturing a Sn-plated steel sheet.

<1. Sn-Plated Steel Sheet>

Figure 4:
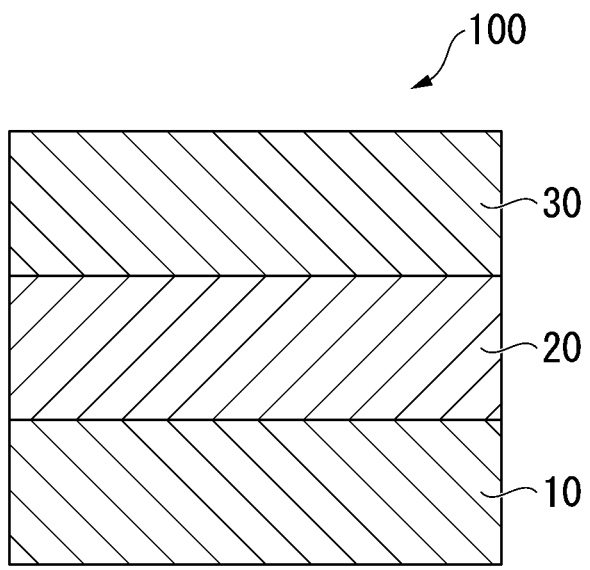
FIG. 4 is a schematic view showing the layer structure of the Sn-plated steel sheet according to the embodiment.

FIG. 4 is a schematic view showing the layer structure of a Sn-plated steel sheet according to an embodiment. As shown in FIG. 4, a Sn-plated steel sheet 100 includes a steel sheet 10, a Sn-plated layer 20 that is provided on at least one surface of the steel sheet 10, and a film 30 that is provided on a surface of the Sn-plated layer 20 and includes zirconium oxide and tin oxide.

In the embodiment, the Sn-plated layer 20 and the film 30 may be formed on at least one of two surfaces of the steel sheet 10.

More specifically, the Sn-plated steel sheet 100 according to the embodiment has the film 30 including zirconium oxide and tin oxide on the Sn-plated steel sheet in which the Sn-plated layer 20 is formed on at least one surface of the steel sheet 10, the amount of zirconium oxide in the film 30 is 0.2 mg/m² to 50 mg/m² in terms of metal Zr amount, in a depth direction analysis by X-ray photoelectron spectroscopy (XPS) (hereinafter, also referred to as "XPS depth direction analysis"), a depth position A at which an element concentration of Zr present as the zirconium oxide is maximum is positioned closer to a surface of the film 30 than a depth position B at which an element concentration of Sn present as the tin oxide is maximum, and a distance between the depth position A and the depth position B in a depth direction is 0.5 nm or more.

(1.1 Steel Sheet)

The steel sheet 10 used as a base metal for the Sn-plated steel sheet 100 according to the embodiment is not particularly limited. A steel sheet 10 generally used in a Sn-plated steel sheet for a container can be used, and examples thereof include low carbon steel and ultra low carbon steel.

(1.2 Sn-Plated Layer)

Sn plating is applied to at least one surface of the steel sheet 10 to form the Sn-plated layer 20. The corrosion resistance of the Sn-plated steel sheet 100 is improved by the Sn plating. The term "Sn plating" in the specification includes not only plating with metal Sn, but also plating with metal Sn with impurities mixed therein, and plating with metal Sn with trace elements added.

In the Sn-plated layer 20 according to the embodiment, the Sn adhesion amount per unit surface area is not particularly limited, but the amount is preferably 0.1 g/m² to 15 g/m² in terms of metal Sn amount. In a case where the adhesion amount per unit surface area of the Sn-plated layer is 0.1 g/m² or more in terms of Sn, a suitable corrosion resistance can be obtained. In addition, in a case where the adhesion amount per unit surface area of the Sn-plated layer 20 is 15 g/m² or less in terms of Sn, the corrosion resistance improvement effect by Sn can be sufficiently obtained while a decrease in adhesion and an increase in cost are suppressed.

Here, the adhesion amount of Sn per unit surface area is a value measured by, for example, an electrolytic method or a fluorescent X-ray method described in JIS G 3303.

(1.3 Film Including Zirconium Oxide and Tin Oxide)

The Sn-plated steel sheet 100 according to the embodiment has the film (chemical conversion film) 30 including zirconium oxide and tin oxide on the surface of the Sn-plated layer 20.

Figure 1:
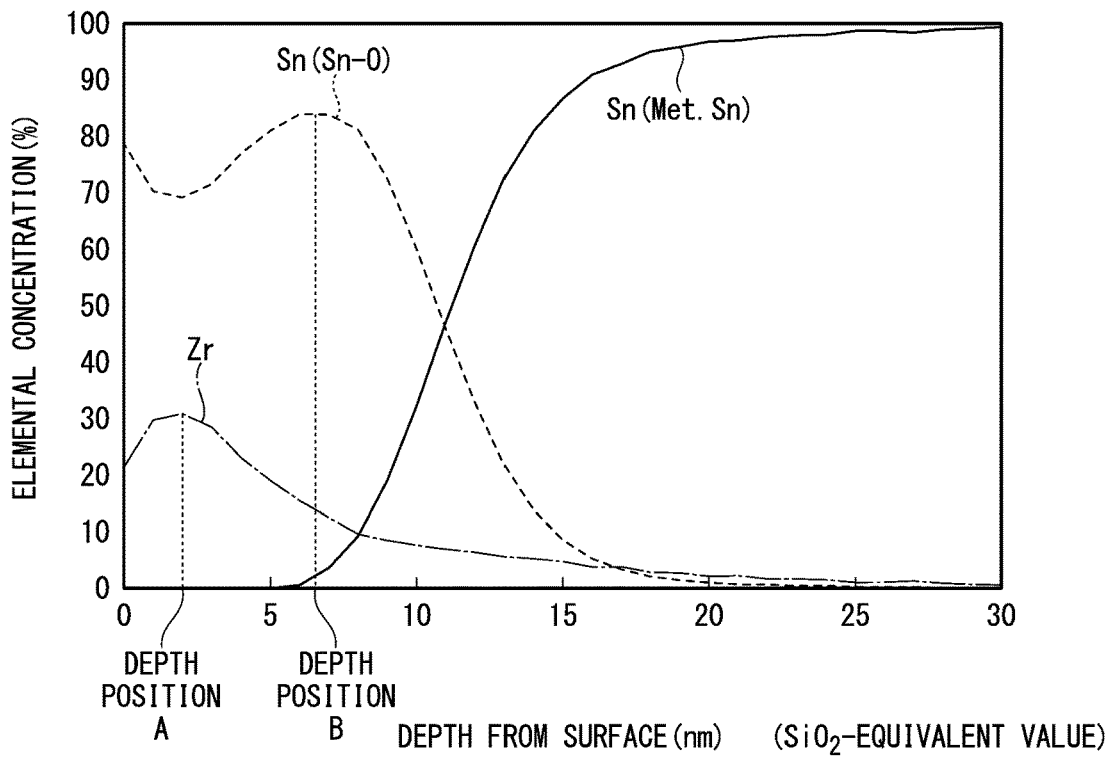
FIG. 1 is a view showing a positional relationship between the peak of zirconium oxide and the peak of tin oxide when X-ray photoelectron spectroscopy (XPS) is performed on a Sn-plated steel sheet according to an embodiment.

As described above, the amount of the zirconium oxide in the film 30 per unit surface area is 0.2 mg/m² to 50 mg/m² in terms of metal Zr amount. In the XPS depth direction analysis, the depth position A at which the element concentration of Zr present as the zirconium oxide is maximum is positioned closer to the surface of the film 30 than the depth position B at which the element concentration of Sn present as the tin oxide is maximum, and the distance between the depth position A and the depth position B in the depth direction is 0.5 nm or more (for example, refer to FIG. 1).

The distance between the depth position A and the depth position B in the depth direction is preferably 1.0 nm or more and more preferably 1.5 nm or more.

The film 30 is defined as a range from the surface of the Sn-plated steel sheet 100 to the depth position at which the element concentration of metal tin is 90% in the XPS depth direction analysis. In addition, the element concentration is a concentration when the total element concentration of Sn present as the tin oxide, Sn present as metal tin, and Zr present as the zirconium oxide is 100% in the XPS depth direction analysis.

In the Sn-plated steel sheet 100 according to the embodiment, by providing the film 30 including the zirconium oxide and the tin oxide on the surface of the Sn-plated layer 20, it is possible to improve the discoloration resistance at the time of heating. Although the reason for this is not clear, after detailed investigation, the present inventors consider it to be for the following reason.

Discoloration accompanied by heating applied to the Sn-plated steel sheet at the time of a coating baking treatment and a sterilization treatment is caused by the growth of tin oxide formed by the reaction between Sn in the Sn-plated layer 20 and oxygen. By forming the film 30 including zirconium oxide on the surface of the Sn-plated layer 20, it is considered possible to inhibit the diffusion of oxygen to the surface of the Sn-plated layer 20 to suppress the formation and growth of tin oxide.

Figure 2:
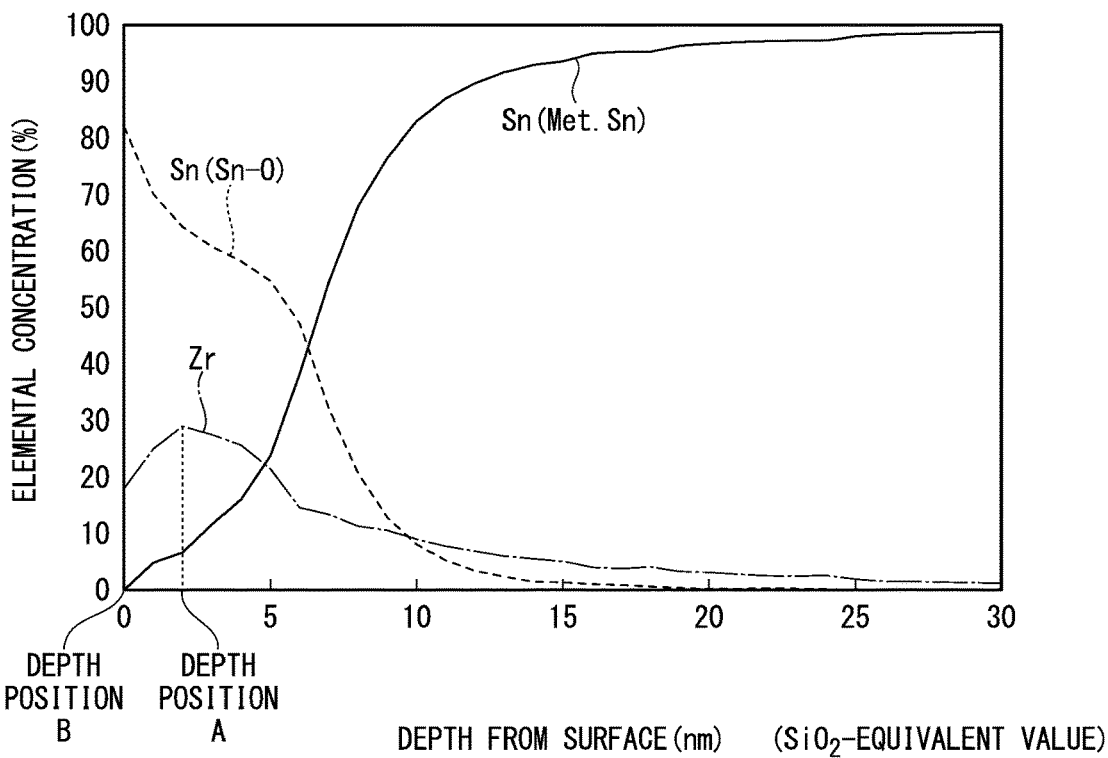
FIG. 2 is a view showing a positional relationship between the peak of zirconium oxide and the peak of tin oxide when X-ray photoelectron spectroscopy (XPS) is performed on a Sn-plated steel sheet according to the related art.

However, in a Sn-plated steel sheet having the zirconium film of the related art, in the XPS depth direction analysis, the depth position at which the element concentration of Zr present as zirconium oxide is maximum is present closer to the inner surface of the film than the depth position at which the element concentration of Sn present as tin oxide is maximum. That is, more tin oxide is present on the surface side than zirconium oxide (refer to, for example, FIG. 2). Therefore, in the Sn-plated steel sheet of the related art, growth of tin oxide is considered to cause discoloration by further oxidation of tin oxide (from SnO to $SnO_2$), or oxygen diffusion and reaction to an oxygen deficient site in the tin oxide.

On the other hand, as in the present invention, in a case where, in XPS depth direction analysis, the depth position A at which the element concentration of Zr present as the zirconium oxide is maximum is positioned closer to the surface of the film 30 than the depth position B at which the element concentration of Sn present as the tin oxide is maximum, and the distance between the depth position A and the depth position B in the depth direction is 0.5 nm or more (for example, refer to FIG. 1), oxygen diffusion to the surface of the Sn-plated layer 20 is suppressed by the zirconium oxide and thus the growth of the tin oxide is also suppressed.

In addition, the present inventors found that, in a case where the depth position A is positioned closer to the surface side of the film 30 than the depth position B but the distance between the depth position A and the depth position B in the depth direction is less than 0.5 nm, suitable discoloration resistance cannot be obtained. The reason is not clear, but it is considered that the zirconium oxide has an insufficient effect of suppressing the oxygen diffusion to the surface of the Sn-plated layer 20.

In order to realize the above-described effect of suppressing the growth of the tin oxide, zirconium oxide in an amount per unit surface area of 0.2 mg/m² to 50 mg/m² in terms of metal Zr amount is required. When the amount of the zirconium oxide is within the above range, it is possible to secure the discoloration resistance at the time of heating, coating film adhesion, and sulfide staining resistance. In a case where the amount of the zirconium oxide is less than 0.2 mg/m² in terms of metal Zr amount, the growth of the tin oxide cannot be sufficiently suppressed, and also sulfide staining resistance deteriorates. In a case where the amount of the zirconium oxide is more than 50 mg/m² in terms of metal Zr amount, since the amount of the zirconium oxide is excessive, coating film adhesion deteriorates and corrosion resistance also deteriorates. The amount of the zirconium oxide per unit surface area is preferably 1.0 mg/m² to 30 mg/m² and more preferably 2.0 mg/m² to 10 mg/m² in terms of metal Zr amount.

In a case where the film 30 is subjected to an XPS depth direction element analysis, the element concentration of Zr at the depth position A is preferably 20% or more. When the element concentration of Zr at the depth position A is 20% or more, the diffusion of oxygen to the surface of the Sn-plated layer 20 can be effectively suppressed. More preferably, the element concentration of Zr at the depth position A is 30% or more.

In a case where a depth position ⅓ of the thickness of the film 30 from the surface of the film 30 is set as a depth position C and the film 30 is subjected to the XPS depth direction analysis, it is preferable for the depth position A to be positioned closer to the surface than the depth position C. Thus, the diffusion of oxygen to the surface of the Sn-plated layer 20 can be more effectively suppressed.

It is preferable for the film 30 to further include a phosphate compound, and in the film 30, a value $\alpha/\beta$ obtained by dividing an amount $\alpha$ (unit: mg/m²) of the phosphate compound in terms of P amount by an amount $\beta$ (unit: mg/m²) of the zirconium oxide in terms of metal Zr amount is 0.2 to 2.0. Examples of the phosphate compound include tin phosphate and zirconium phosphate.

Since P is included in the film 30, the film 30 including zirconium oxide and tin oxide becomes dense and sulfide staining resistance and corrosion resistance after coating are improved. Examples of the phosphate compound include metal phosphates such as tin phosphate and zirconium phosphate. In a case where $\alpha/\beta$ is more than 2, the amount of the phosphate compound is excessive and the effect of improving sulfide staining resistance is not sufficient. Thus, this case is not preferable. α/β is more preferably 0.4 to 1.5.

The state in which zirconium oxide and tin oxide are present in the film 30 may be a mixed state of both oxides or a solid solution state of the oxides, regardless of the state in which they are present. In addition to the zirconium oxide and the tin oxide, the film 30 may include zirconium hydroxide, metal zirconium, or metal tin. Further, for example, even when elemental simple substances and compounds other than the zirconium oxide and the tin oxide are inevitably included in the film 30 as impurities, there is no problem. For example, elements such as C, N, F, Na, Mg, Al, Si, P, S, Cl, K, Ca, Ti, V, Co, Ni, and Zn may be included in the film 30.

The adhesion amount of each of Zr and P is set to a value obtained by immersing the Sn-plated steel sheet 100 having the film 30 on the surface thereof according to the embodiment in, for example, an acid solution of hydrofluoric acid, sulfuric acid, or the like for dissolution, and measuring the obtained solution by a chemical analysis such as inductively coupled plasma (ICP) emission spectrometry.

The Sn-plated steel sheet 100 according to the embodiment may be manufactured by any method, and for example, can be manufactured by a method for manufacturing a Sn-plated steel sheet described below.

<2. Method for Manufacturing Sn-Plated Steel Sheet>

Hereinafter, a method for manufacturing the Sn-plated steel sheet 100 having the film 30 including zirconium oxide and tin oxide according to the embodiment will be described.

The method for manufacturing a Sn-plated steel sheet according to the embodiment includes a first step of performing a cathodic electrolytic treatment on a Sn-plated steel sheet having a Sn-plated layer 20 formed on at least one surface of a steel sheet 10 in a solution including zirconium ions to form a zirconium oxide on the Sn-plated layer 20, a second step of performing a cleaning treatment on the Sn-plated steel sheet by an immersion treatment or a spray treatment with warm water at 25° C. or higher for 0.3 seconds or longer, and a third step of performing an anodic electrolytic treatment on the Sn-plated steel sheet in an electrolyte solution having a Zr ion concentration of 270 ppm or less to form a film 30 including the zirconium oxide and tin oxide on the Sn-plated steel sheet.

In addition, in this embodiment, before the cathodic electrolytic treatment, while the steel sheet 10 is prepared, the Sn-plated layer 20 is formed on at least one surface of a steel sheet by Sn plating.

(2.1 Preparation of Steel Sheet)

The manufacturing method and material of the steel sheet 10 are not particularly limited, and examples thereof include steel sheets manufactured through the steps of casting to hot rolling, pickling, cold rolling, annealing, temper rolling and the like.

(2.2 Formation of Sn-Plated Layer)

Subsequently, the Sn-plated layer 20 is formed on at least one surface of the steel sheet 10. The method of applying Sn plating to the surface of the steel sheet 10 is not particularly limited, but a known electro plating method is preferable. A melting method of plating by immersing the steel sheet 10 in molten Sn may be used. As the electro plating method, for example, known electrolytic methods using a ferrostan bath, a halogen bath, an alkaline bath or the like can be used.

After the Sn plating, a heating and melting treatment in which the Sn-plated steel sheet 10 is heated to 231.9° C., which is the melting point of Sn, or higher may be performed. By this heating and melting treatment, the surface of the Sn-plated steel sheet is given gloss, an alloy layer of Sn and Fe (not shown) is formed between the Sn-plated layer 20 and the steel sheet 10, and thus the corrosion resistance is further improved. Thus, this case is preferable.

In addition, in a case of using the steel sheet 10 in which the Sn-plated layer 20 is formed in advance, the second step can be omitted.

(2.3 Cathodic Electrolytic Treatment)

In order to form the film 30 according to the embodiment, first, a zirconium oxide layer containing zirconium oxide (not shown) is formed on the Sn-plated layer 20 of the Sn-plated steel sheet (first step).

The zirconium oxide layer containing zirconium oxide (not shown) can be formed on the Sn-plated steel sheet by performing a cathodic electrolytic treatment on the Sn-plated steel sheet in a solution including zirconium ions.

As a method for forming the zirconium oxide layer (not shown), in addition to the cathodic electrolytic treatment, an immersion treatment may also be used. However, in the immersion treatment, the surface of the Sn-plated steel sheet that is a base material is etched to form a zirconium oxide layer containing zirconium oxide. Therefore, the adhesion amount of the zirconium oxide layer (not shown) is likely to be uneven, and the treatment time is also long, which is disadvantageous for industrial production.

On the other hand, in the cathodic electrolytic treatment, a uniform film can be obtained through a combination of forced charge transfer and surface cleaning due to hydrogen generation at the steel sheet interface, and an adhesion promoting effect due to an increase in pH. Further, in the cathodic electrolytic treatment, due to the coexistence of nitrate ions and ammonium ions in the treatment solution, the treatment can be performed in a short time of several seconds to several tens of seconds, which is extremely industrially advantageous.

Therefore, the cathodic electrolytic treatment is used to form the zirconium oxide layer (not shown) containing zirconium oxide according to the embodiment.

The concentration of the zirconium ions in the solution used for the cathodic electrolytic treatment (hereinafter referred to as cathodic electrolytic treatment solution) may be appropriately adjusted according to the production equipment and production rate (capacity), but for example, the concentration of the zirconium ions is preferably 100 ppm to 4000 ppm. The cathodic electrolytic treatment solution may include fluorine ions, ammonium ions, nitrate ions, sulfate ions, phosphate ions, and the like.

The liquid temperature of the cathodic electrolytic treatment solution is not particularly limited, but, for example, the liquid temperature is preferably in a range of 10° C. to 50° C. By performing the cathodic electrolytic treatment at 50° C. or lower, a dense and uniform film structure formed by very fine particles can be formed. On the other hand, by performing the cathodic electrolytic treatment at 10° C. or higher, the film formation efficiency is improved.

The pH of the cathodic electrolytic treatment solution is not particularly limited, but the pH is preferably 3 to 5. In a case where the pH is 3 or more, the zirconium oxide formation efficiency is improved, and when the pH is 5 or less, precipitation is less likely to occur in the treatment solution, and continuous productivity is improved. Thus, this case is preferable.

For the purpose of adjusting the pH of the cathodic electrolytic treatment solution or improving the electrolytic efficiency, for example, nitric acid, ammonia water or the like may be added to the cathodic electrolytic treatment solution.

The current density in the cathodic electrolytic treatment is preferably, for example, 0.05 A/dm$^2$ to 50 A/dm$^2$. In a case where the current density is 0.05 A/dm$^2$ or more, the zirconium oxide formation efficiency can be sufficiently improved, and the formation of the film 30 containing zirconium oxide and tin oxide as defined in the present invention can be further secured. In a case where the current density is 50 A/dm$^2$ or less, the zirconium oxide formation efficiency is excessively high and the formation of zirconium oxide which is coarse and deteriorates adhesion can be prevented. A more preferable current density range is 1 A/dm$^2$ to 10 A/dm$^2$.

When the zirconium oxide layer (not shown) is formed, the time for the cathodic electrolytic treatment is not particularly limited and may be adjusted appropriately to obtain a desired Zr adhesion amount.

As a solvent used for the cathodic electrolytic treatment solution, for example, distilled water can be used. However, the solvent is not limited to water such as distilled water, and can be appropriately selected according to the compound to be dissolved, the method of forming the film 30, and the like.

As a source of zirconium, for example, a zirconium complex such as H$_2$ZrF$_6$ can be used. The Zr in the Zr complex becomes Zr$^{4+}$ due to an increase in pH at the cathode electrode interface and is present in the cathodic electrolytic treatment solution. Such Zr ions are further reacted in the cathodic electrolytic treatment solution to form zirconium oxide. In a case where the cathodic electrolytic treatment solution includes phosphoric acid, zirconium phosphate is also formed.

The energization pattern at the time of the cathodic electrolytic treatment may be continuous energization or intermittent energization.

The relative flow velocity between the cathodic electrolytic treatment solution and the steel sheet 10 at the time of the cathodic electrolytic treatment is preferably 50 m/min or more. When the relative flow velocity is 50 m/min or more, the pH of the surface of the steel sheet 10 accompanied by the hydrogen generation at the time of energization can be easily made uniform, and the formation of coarse zirconium oxide can be suppressed. The upper limit of the relative flow rate is not particularly limited.

(2.4 Cleaning Treatment)

In order to form the film 30 according to the embodiment, the zirconium oxide layer (not shown) including zirconium oxide is formed on the surface of the Sn-plated layer 20 of the Sn-plated steel sheet, and then a cleaning treatment is performed by an immersion treatment or a spray treatment with warm water at 25° C. or higher for 0.3 seconds or longer (second step).

The oxide and hydroxide of tin, and metal tin which are inevitably present on the surface of zirconium oxide layer (not shown) after the cathodic electrolytic treatment are removed by the cleaning treatment, and further, the oxide and hydroxide of tin, and the metal tin on the surface can be effectively removed in combination with the subsequent anodic electrolytic treatment.

The temperature of the warm water used for the cleaning treatment is 25° C. or higher. In a case where the temperature of the warm water is lower than 25° C., the oxide and hydroxide of tin and the metal tin which are inevitably present on the surface of the zirconium oxide layer (not shown) cannot be sufficiently reduced. Therefore, when the anodic electrolytic treatment is performed after the cleaning treatment, it is difficult to obtain suitable discoloration resistance at the time of heating.

The temperature of the warm water is preferably 30° C. or higher and lower than 40° C., and these temperatures are preferable because they allow the oxide and hydroxide of tin to be effectively reduced.

The time for the cleaning treatment is 0.3 seconds or longer. In a case where the time for the cleaning treatment is shorter than 0.3 seconds, the oxide and hydroxide of tin cannot be effectively reduced, and thus this case is not preferable. The time for the cleaning treatment is preferably 0.4 seconds to 3 seconds, and this case is preferable since the oxide and hydroxide of tin can be effectively reduced.

The compounds included in the warm water are not particularly limited. The pH of the warm water is also not particularly limited. However, in a case where the pH is 5 to 8, the oxide and hydroxide of tin and the metal tin on the surface can be uniformly removed, and thus this case is preferable.

(2.5 Anodic Electrolytic Treatment)

Next, the Sn-plated steel sheet is subjected to an anodic electrolytic treatment in an electrolyte solution to form the film 30 including zirconium oxide and tin oxide on the Sn-plated layer 20 (third step). Thus, it is possible to manufacture the Sn-plated steel sheet 100 according to the embodiment.

By the cleaning treatment, the tin oxide, tin hydroxide, and metal tin inevitably present on the surface of the zirconium oxide layer (not shown) are reduced. Then, by performing the anodic electrolytic treatment on the Sn-plated steel sheet after the cleaning treatment, the tin oxide, tin hydroxide, and metal tin are dissolved, and thus the amount can be further reduced. In addition, by the anodic electrolytic treatment, it is possible to manufacture a Sn-plated steel sheet in which, in the XPS depth direction analysis, the depth position A at which the element concentration of Zr present as the zirconium oxide is maximum is positioned closer to the surface of the film 30 than the depth position B at which the element concentration of Sn present as the tin oxide is maximum, and the distance between the depth position A and the depth position B in the depth direction is 0.5 nm or more.

The pH of the electrolyte solution used for the anodic electrolytic treatment solution (hereinafter referred to as an anodic electrolytic treatment solution) is not particularly limited, and is preferably in a weakly acidic to alkaline pH range. The term "weakly acidic to alkaline" as used herein means that the pH is 3 to 14.

Examples of the electrolyte included in the above anodic electrolytic treatment solution include hydroxides and carbonates of alkali and alkaline earth metals, phosphates, organic acid salts, borates and sulfates. More specific examples include sodium carbonate, sodium hydrogen carbonate, sodium diphosphate, trisodium citrate, ammonium monotartrate, sodium sulfate and the like.

The concentration of the electrolyte is not particularly limited. The upper limit of the concentration of the electrolyte is also not particularly limited, but in a case where the concentration is excessively high, the electrolyte may be precipitated during storage and cause problems such as pipe clogging. Therefore, the concentration of the electrolyte is preferably equal to or less than the solubility of the electrolyte at 0° C.

The concentration of the electrolyte is preferably a concentration satisfying 0.5 S/m to 4 S/m in terms of electrical conductivity, and more preferably a concentration satisfying 1 S/m to 2.5 S/m in terms of electrical conductivity. The electrical conductivity may be measured using a commercially available electrical conductivity meter, and for example, an electrical conductivity cell CT-27112B, manufactured by DKK-TOA CORPORATION or the like can be used.

Further, the Zr ion concentration in the anodic electrolytic treatment solution is 270 ppm or less. In a case where the Zr ion concentration is more than 270 ppm, the Zr ions are mixed into the film 30 to form a rough film, and the discoloration resistance at the time of heating cannot be sufficiently improved.

The liquid temperature of the anodic electrolytic treatment solution is not particularly limited, but is preferably 5° C. to 60° C. and more preferably 15° C. to 50° C. In a case where the temperature is high enough, the electrolytic efficiency can be increased, and the film 30 can be more reliably formed.

The current density at the time of the anodic electrolytic treatment is not particularly limited and is preferably, for example, 0.02 A/dm$^2$ to 50 A/dm$^2$. In a case where the current density is 0.02 A/dm$^2$ to 50 A/dm$^2$, the film 30 having zirconium oxide and tin oxide according to the embodiment can be uniformly and stably formed. In a case where the current density is 0.02 A/dm$^2$ or more, the electrolytic treatment time can be made relatively short, and a decrease in corrosion resistance after coating accompanied by the dissolution of the Sn-plated layer 20 can be prevented. On the other hand, in a case where the current density is 50 A/dm$^2$ or less, since excessive hydrogen generation is suppressed on the Sn-plated steel sheet, and the dissolution of the Sn-plated layer 20 accompanied by an increase in pH can be prevented, this case is preferable in terms of production efficiency. The discoloration resistance at the time of heating and sulfide staining resistance can be sufficiently improved by uniform tin oxide formation. A preferable current density range is 0.04 A/dm$^2$ to 10 A/dm$^2$.

The treatment time for the anodic electrolytic treatment is not particularly limited, and can be determined arbitrarily according to the current density, the electrode length, and the production rate (sheet threading speed).

The thickness of a tin oxide distribution in the film 30 can be mainly controlled by the amount of energization (amount of electricity) at the time of the anodic electrolytic treatment. Therefore, in order to obtain the film 30 according to the embodiment, the amount of energization at the time of anodic electrolytic treatment is preferably 0.1 C/dm$^2$ to 10 C/dm$^2$, and more preferably 0.2 C/dm$^2$ to 2.0 C/dm$^2$.

As a solvent for the anodic electrolytic treatment solution, for example, distilled water can be used, but the solvent is not limited to water such as distilled water. The energization pattern at the time of anodic electrolytic treatment may be continuous energization or intermittent energization.

EXAMPLES

Next, while showing Examples and Comparative Examples, the Sn-plated steel sheet and the method for manufacturing a Sn-plated steel sheet according to the embodiments will be described in detail. The examples shown below are merely examples of the Sn-plated steel sheet and the method for manufacturing a Sn-plated steel sheet according to the embodiments, and the Sn-plated steel sheet and the method for manufacturing a Sn-plated steel sheet according to the embodiments are not limited to the following examples.

<Test Material>

Electrolytic alkaline degreasing, water washing, and pickling by immersion in dilute sulfuric acid and water washing were performed on a low carbon cold rolled steel sheet having a sheet thickness of 0.2 mm as pretreatments. Thereafter, electro Sn plating was applied using a phenol sulfonic acid bath, and then a heating and melting treatment was performed. Although the adhesion amount of Sn plating per unit surface area was about 2.8 g/m$^2$ as a standard, in some test materials, the adhesion amount of Sn plating was changed by changing the energization time. In addition, a test material which was not subjected to a heating and melting treatment after the electro Sn plating was also prepared collectively. The adhesion amount of Sn plating was specified by measurement by a fluorescent X-ray method (ZSX Primus manufactured by Rigaku Corporation).

The Sn-plated steel sheet prepared as described above was subjected to a cathodic electrolytic treatment in an aqueous solution including zirconium fluoride to form a zirconium oxide layer on the Sn-plated steel sheet. The bath temperature was adjusted to 35° C., the pH was adjusted to 3 or more and 5 or less, and the cathode electrolysis time was appropriately adjusted according to the desired Zr adhesion amount.

Further, the Sn-plated steel sheet in which the zirconium oxide layer was formed was cleaned by immersing the steel sheet in warm water at a bath temperature of 30° C. for 1 second.

Then, an anodic electrolytic treatment was performed on the steel sheet in a sodium hydrogen carbonate solution (anodic electrolytic treatment solution) having an electric conductivity of 2.0 S/m to form a film. The liquid temperature of the anodic electrolytic treatment solution was 25° C. and the current density of the anodic electrolytic treatment was 1 A/dm$^2$. The cleaning treatment conditions and the anodic electrolytic treatment conditions were changed at some levels. The treatment time for the anodic electrolytic treatment was adjusted appropriately. Further, the Zr ion concentration of the anodic electrolytic treatment solution was as described in the tables.

As comparative examples, a test material in which only zirconium oxide was formed and the anodic electrolytic treatment was not performed, and a test material in which zirconium oxide was not formed and only the anodic electrolytic treatment was performed were prepared together.

The following evaluations were performed on the Sn-plated steel sheets thus prepared.

<Adhesion Amount>

The adhesion amount of Zr per unit surface area was obtained by ICP emission spectrometry.

<XPS Depth Direction Element Analysis>

In the depth direction analysis by XPS (PHI Quantera SXM manufactured by ULVAC-PHI., Inc.), a quantitative analysis of tin oxide, metal tin and zirconium oxide in the depth direction was performed.

In the quantitative analysis, a bonding energy position of Sn3d5/2 corresponding to Sn present as tin oxide was defined as 485.8 eV or more and 487.2 eV or less, a bonding energy position of Sn3d5/2 corresponding to Sn present as metal Sn was defined as 484.3 eV or more and 485.5 eV or less, a bonding energy position of Zr3d5/2 corresponding to Zr present as zirconium oxide was defined as 182.0 eV or more and 182.9 eV or less, and three kinds of tin oxide, metal tin and zirconium oxide were controlled to be 100%.

In the XPS, since the spectrum or the peak position might be shifted (charge shift) due to the influence of charging of the sample, or the like, the peak position was corrected by contaminants (carbon of organic matter) adsorbed on the surface of the sample. Specifically, the quantitative analysis was performed after the entire spectrum was shifted so that the peak position of carbon (Cl s) detected on the surface of the sample was 284.8 eV.

The depth direction analysis was performed to such a depth that the peak was observed at the bonding energy position corresponding to metal Sn, and the peak was not observed at the bonding energy position corresponding to tin oxide. The sputtering condition in the depth direction analysis is Ar sputtering at an interval of 0.5 nm in terms of $SiO_2$. In the XPS depth direction element analysis, a range starting from the surface of the film 30 to the depth position at which the element concentration of metal Sn reached 90% as an ending point was defined as the film 30. Based on this definition, the thickness of the film 30 was determined.

<Positional Relationship Between Depth Position A and Depth Position B>

In the obtained depth direction analysis result by XPS, a case where the depth position A at which the element concentration of Zr present as zirconium oxide was maximum was positioned closer to the surface of the film than the depth position B at which the element concentration of Sn present as tin oxide was maximum, and the distance between the depth position A and the depth position B in the depth direction was 0.5 nm or more was evaluated as "Good" and the opposite case was evaluated "Bad".

The expression "the element concentration is maximum" refers to the local maximum value in a range where the depth direction analysis was performed, but refers to the local maximum value of the absolute maximum value in a case where there are a plurality of absolute maximum values in the range.

Further, in a case where the absolute maximum values are obtained at a plurality of depth positions, the average value of the plurality of depth positions is taken as the "depth position at which the element concentration is maximum". For example, in FIG. 1, the element concentration of Sn present as the tin oxide takes the absolute maximum values at three points at depths of 6.0 nm, 6.5 nm and 7.0 nm from the surface. The depth position B in this case is a position at a depth of 6.5 nm from the surface based on the average value of the three points.

<Element Concentration of Zr at Depth Position A>

A case where the element concentration of Zr at the depth position A was less than 20% was evaluated as "Fair", a case where the element concentration of Zr was 20% or more and less than 30% was evaluated as "Good", and a case where the element concentration of Zr was more than 30% was evaluated as "Very Good".

<Positional Relationship Between Depth Position A and Depth Position C>

The distance from the surface of the film 30 to the depth position A in the depth direction was measured. In addition, the depth position C, which is a depth position ⅓ of the thickness from the surface of the film, was determined by multiplying the thickness of the film 30 determined by the above method by ⅓. A case where the depth position A was positioned closer to the surface than the depth position C was evaluated as "Good", and the opposite case was evaluated as "Fair".

<Discoloration Resistance at the Time of Heating>

A heating test in which the Sn-plated steel sheet manufactured by the above-described method was retained for 30 minutes at a plate temperature of 205° C. to 210° C. was performed in an air furnace. The amount of change Δb* of a color difference b* value before and after the heating test was determined and evaluated.

A case where Δb* was 1 or less was evaluated as "Very Good", a case where Δb* was more than 1 and 2 or less was evaluated as "Good", a case where Δb* was more than 2 and 3 or less was evaluated as "Fair", and a case where Δb* was more than 3 was evaluated as "Bad". The evaluations "Very Good", "Good", and "Fair" were taken as "Pass".

b* was measured using SC-GVS, which is a commercially available color difference meter manufactured by Suga Test Instruments Co., Ltd., according to JIS Z 8722, and the measurement conditions of b* were a light source C, total reflection, and a measurement diameter of 30 mm.

<Coating Film Adhesion>

The coating film adhesion was evaluated as follows.

A commercially available can epoxy resin paint was applied to the surface of the Sn-plated steel sheet prepared as described above in a dry mass of 7 g/m², baked at a temperature of 200° C. for 10 minutes, and then left at room temperature for 24 hours. Then, scratches that reached the surface of the steel sheet were put into the obtained Sn-plated steel sheet in a grid (scratches of 7 rows and 7 columns with intervals of 3 mm), and the coating film adhesion was evaluated by performing a tape peeling test on the portion.

A case where the coating film did not peel off at any of the tape-applied portions was evaluated as "Very Good", a case where the coating film peeled off outside the grid was evaluated as "Good", and a case where the coating film peeled off in the grid was evaluated as "Bad".

The cases where the evaluations were "Very Good" and "Good" were taken as "Pass".

<Sulfide Staining Resistance>

The sulfide staining resistance was evaluated as follows.

A commercially available can epoxy resin paint was applied to the surface of the Sn-plated steel sheet prepared by the above-described method in a dry mass of 7 g/m², baked at a temperature of 200° C. for 10 minutes, and then left at room temperature for 24 hours. Thereafter, the obtained Sn-plated steel sheet was cut into a predetermined size and immersed in an aqueous solution containing sodium dihydrogenphosphate: 0.3%, sodium hydrogenphosphate: 0.7%, and L-cysteine hydrochloride: 0.6%. The immersed Sn-plated steel sheet was placed in a sealed container and retorted at a temperature of 121° C. for 60 minutes. The sulfide staining resistance was evaluated from the external appearance of the Sn-plated steel sheet after the retort treatment.

A case where the external appearance was not changed at all before and after the test was evaluated as "Very Good", a case where blackening of 10% by area or less occurred was evaluated as "Good", and a case where blackening of more than 10% by area occurred was evaluated as "Bad". The evaluations "Very Good" and "Good" were taken as "Pass".

<Corrosion Resistance after Coating>

A commercially available can epoxy resin paint was applied to the surface of the Sn-plated steel sheet prepared by the above-described method in a dry mass of 7 g/m², baked at a temperature of 200° C. for 10 minutes, and then left at room temperature for 24 hours. Thereafter, the obtained Sn-plated steel sheet was cut into a predetermined size and immersed in commercially available tomato juice at a temperature of 60° C. for 7 days. The corrosion resistance after coating was evaluated by visually observing the occurrence of rust after immersion.

A case where there was no rust at all was evaluated as "Good", a case where rust of 10% by area or less was generated was evaluated as "Fair", and a case where rust of more than 10% by area was generated was evaluated as "Bad".

The cases where the evaluations were "Good" and "Fair" were taken as "Pass".

Example 1

Table 1 shows the results in a case where the zirconium oxide content of the film is changed. Although the manufacturing method is not shown in Table 1, the zirconium concentration (zirconium fluoride) in the cathodic electrolytic treatment solution at the time of manufacturing the Sn-plated steel sheet in Table 1 was 80 to 5000 ppm. After the zirconium oxide was formed, an anodic electrolytic treatment was performed in a sodium hydrogen carbonate solution (liquid properties: weakly acidic to alkaline), the Zr ion concentration was 10 ppm, and the electric conductivity was 2.0 S/m to form a film. The liquid temperature of the anodic electrolytic treatment solution was 25° C. and the amount of energization of the anodic electrolytic treatment was 1.6 C/dm$^2$ at most. For comparison, test materials were prepared without a cleaning treatment and/or an anodic electrolytic treatment in some examples.

TABLE 1

| No. | Sn-plated layer Sn one surface adhesion amount (g/m²) | Film layer Zr adhesion amount (mg/m²) | (Distance from surface to depth position A)/film thickness | Positional relationship between depth position A and depth position C | Positional relationship between depth position A and depth position B | Color difference b* Initial | Color difference b* After elapse of time | Color difference b* Δb* | Discoloration resistance at the time of heating | Coating film adhesion | Sulfide staining resistance | Corrosion resistance after coating | Remark |
|---|---|---|---|---|---|---|---|---|---|---|---|---|---|
| A1 | 2.8 | 0.2 | 0.41 | Fair | Good | 2.2 | 4.4 | 2.2 | Fair | Very Good | Good | Fair | Inventive Example |
| A2 | 2.8 | 1.1 | 0.32 | Good | Good | 2.3 | 3.7 | 1.4 | Good | Very Good | Good | Good | Inventive Example |
| A3 | 2.8 | 2.2 | 0.21 | Good | Good | 2.8 | 3.3 | 0.5 | Very Good | Very Good | Very Good | Good | Inventive Example |
| A4 | 2.8 | 10 | 0.20 | Good | Good | 2.8 | 3.3 | 0.5 | Very Good | Very Good | Very Good | Good | Inventive Example |
| A5 | 2.8 | 12 | 0.28 | Good | Good | 2.9 | 3.4 | 0.5 | Very Good | Very Good | Very Good | Good | Inventive Example |
| A6 | 2.8 | 0.2 | 0.21 | Good | Good | 2.9 | 3.2 | 0.3 | Very Good | Very Good | Good | Fair | Inventive Example |
| A7 | 2.8 | 0.8 | 0.19 | Good | Good | 2.8 | 3.1 | 0.3 | Very Good | Very Good | Good | Good | Inventive Example |
| A8 | 2.8 | 2 | 0.11 | Good | Good | 2.8 | 3.0 | 0.2 | Very Good | Very Good | Very Good | Good | Inventive Example |
| A9 | 2.8 | 5 | 0.13 | Good | Good | 2.7 | 3.0 | 0.3 | Very Good | Very Good | Very Good | Good | Inventive Example |
| A10 | 2.8 | 8 | 0.16 | Good | Good | 2.8 | 3.2 | 0.4 | Very Good | Very Good | Very Good | Good | Inventive Example |
| A11 | 2.8 | 12 | 0.14 | Good | Good | 2.8 | 3.1 | 0.3 | Very Good | Good | Very Good | Good | Inventive Example |
| A12 | 2.8 | 16 | 0.14 | Good | Good | 2.9 | 3.2 | 0.3 | Very Good | Good | Very Good | Good | Inventive Example |
| A13 | 2.8 | 23 | 0.12 | Good | Good | 3.1 | 3.3 | 0.2 | Very Good | Good | Very Good | Good | Inventive Example |
| A14 | 2.8 | 35 | 0.41 | Fair | Good | 2.9 | 4.3 | 1.4 | Good | Good | Good | Fair | Inventive Example |
| A15 | 2.8 | 48 | 0.39 | Fair | Good | 3.1 | 5.5 | 2.4 | Fair | Good | Good | Fair | Inventive Example |
| A16 | 2.8 | 23 | 0.12 | Good | Good | 3.3 | 3.5 | 0.2 | Very Good | Good | Good | Good | Inventive Example |

TABLE 1-continued

| No. | Sn-plated layer Sn one surface adhesion amount (g/m²) | Zr adhesion amount (mg/m²) | Film layer (Distance from surface to depth position A)/film thickness | Film layer Positional relationship between depth position A and depth position C | Positional relationship between depth position A and depth position B | Color difference b* Initial | Color difference b* After elapse of time | Δb* | Performance Discoloration resistance at the time of heating | Performance Coating adhesion | Performance Sulfide staining resistance | Performance Corrosion resistance after coating | Remark |
|---|---|---|---|---|---|---|---|---|---|---|---|---|---|
| A17 | 2.8 | 20 | 0.15 | Good | Good | 3.2 | 3.5 | 0.3 | Very Good | Very Good | Good | Good | Inventive Example |
| A18 | 2.8 | 4 | 0.32 | Good | Good | 2.8 | 3.6 | 0.8 | Very Good | Very Good | Very Good | Good | Inventive Example |
| A19 | 2.8 | 3 | 0.32 | Good | Good | 2.5 | 3.4 | 0.9 | Very Good | Very Good | Very Good | Good | Inventive Example |
| A20 | 2.8 | 0.5 | 0.33 | Good | Good | 2.4 | 3.9 | 1.5 | Very Good | Very Good | Very Good | Good | Inventive Example |
| A21 | 2.8 | 0.3 | 0.13 | Good | Good | 2.1 | 2.5 | 0.4 | Very Good | Very Good | Good | Fair | Inventive Example |
| A22 | 2.8 | 4 | 0.15 | Good | Good | 2.3 | 2.8 | 0.5 | Very Good | Very Good | Very Good | Good | Inventive Example |
| A23 | 2.8 | 5 | 0.20 | Good | Good | 2.6 | 3.0 | 0.4 | Very Good | Very Good | Very Good | Good | Inventive Example |
| a1 | 2.8 | 0.1 | 0.37 | Fair | Good | 2.8 | 6.5 | 3.7 | Bad | Good | Bad | Bad | Comparative Example |
| a2 | 2.8 | 55 | 0.34 | Fair | Good | 5.5 | 8.6 | 3.1 | Bad | Bad | Very Good | Good | Comparative Example |
| a3 | 2.8 | 4 | 0.42 | Fair | Bad | 3.1 | 11.9 | 8.8 | Bad | Good | Good | Fair | Comparative Example |
| a4 | 2.8 | 5 | 0.40 | Fair | Bad | 4.5 | 14.0 | 9.5 | Bad | Very Good | Good | Good | Comparative Example |
| a5 | 2.8 | 0 | 0.41 | Fair | Bad | 2.8 | 9.6 | 6.8 | Bad | Good | Bad | Bad | Comparative Example |
| a6 | 2.8 | 5 | 0.43 | Fair | Bad | 4.5 | 15.4 | 9.8 | Bad | Bad | Very Good | Good | Comparative Example |

As is clear from Table 1, in Inventive Examples, all evaluation results were good. On the other hand, in Comparative Examples, the discoloration resistance at the time of heating deteriorated. Further, in all of Comparative Examples a1 to a6, at least one of the coating film adhesion, sulfide staining resistance, and corrosion resistance after coating deteriorated.

Figure 3:
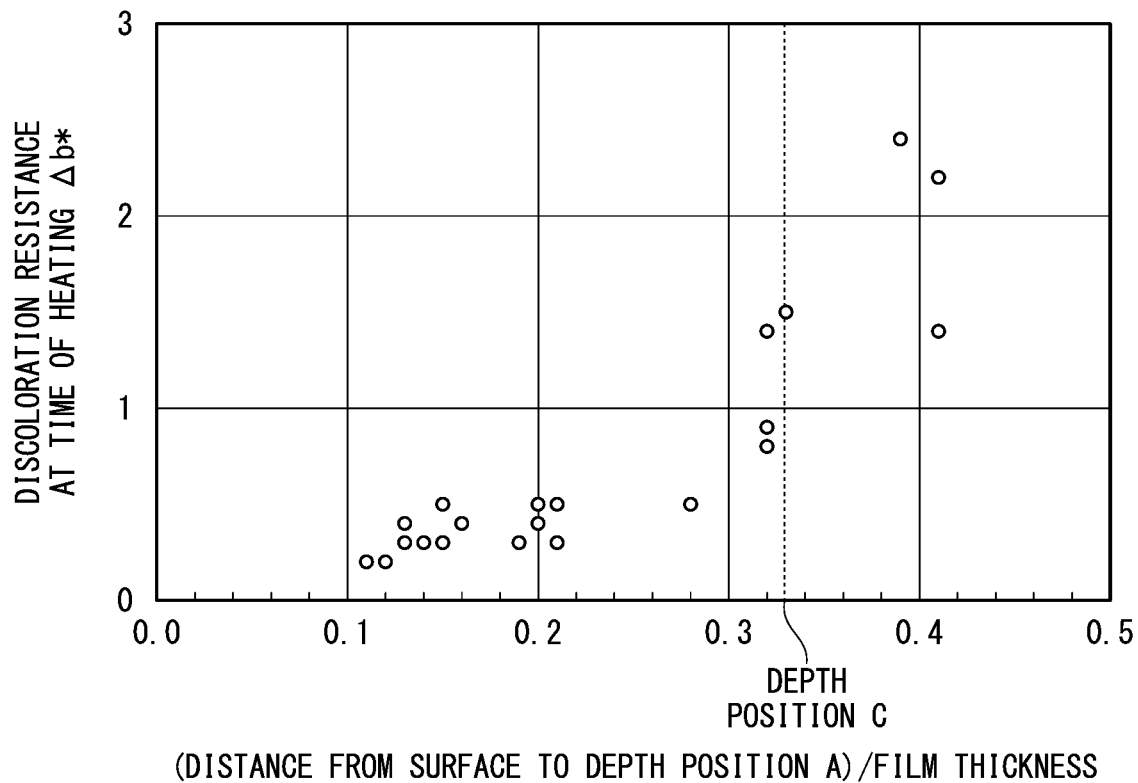
FIG. 3 is a view showing a relationship between a position (depth) at which zirconium present as zirconium oxide shows the maximum element concentration with respect to a film thickness in a depth direction analysis by X-ray photoelectron spectroscopy (XPS) and discoloration resistance after heating.

Moreover, based on the results of Table 1, the relationship between the position of the depth position A and the discoloration resistance at the time of heating is shown in FIG. 3. As shown in FIG. 3, in a case where the depth position A was positioned closer to the surface than the depth position C (the depth position ⅓ of the film thickness from the film surface), preferable discoloration resistance was obtained.

Example 2

Table 2 shows the results in a case where the element concentration of Zr at the depth position A is changed. The element concentration of Zr at the depth position A was changed by changing the amount of electricity in the anodic electrolytic treatment.

TABLE 2

| | Sn-plated layer | | Film | | Evaluation | | | | | | |
|---|---|---|---|---|---|---|---|---|---|---|---|
| | Sn one surface | Zr | Positional relationship | Element | Discoloration resistance at the time of heating Color difference b* | | | | | Corrosion | |
| No. | adhesion amount (g/m²) | adhesion amount (mg/m²) | between depth position A and depth position B | concentration of Zr at depth position A | Initial | After elapse of time | Δb* | Coating film adhesion | Sulfide staining resistance | resistance after coating | Remark |
| B1 | 2.8 | 4 | Good | Fair | 2.6 | 5.5 | 2.9 | Fair | Very Good | Good | Good | Inventive Example |
| B2 | 2.8 | 5 | Good | Good | 2.6 | 4.4 | 1.8 | Good | Very Good | Good | Good | Inventive Example |
| B3 | 2.8 | 4 | Good | Very Good | 2.7 | 3.5 | 0.8 | Very Good | Very Good | Very Good | Good | Inventive Example |
| B4 | 2.8 | 5 | Good | Very Good | 2.8 | 3.3 | 0.5 | Very Good | Very Good | Very Good | Good | Inventive Example |
| B5 | 2.8 | 5 | Good | Very Good | 2.8 | 3.3 | 0.5 | Very Good | Very Good | Very Good | Good | Inventive Example |
| B6 | 2.8 | 5 | Good | Very Good | 2.7 | 3.1 | 0.4 | Very Good | Very Good | Very Good | Good | Inventive Example |
| B7 | 2.8 | 4 | Good | Very Good | 2.8 | 3.1 | 0.3 | Very Good | Good | Very Good | Good | Inventive Example |
| B8 | 2.8 | 3 | Good | Very Good | 2.7 | 2.9 | 0.2 | Very Good | Good | Very Good | Good | Inventive Example |

As is clear from Table 2, in Inventive Examples, all evaluation results were good.

Example 3

Table 3 shows differences in evaluation results when the value of α/β is changed. α/β was changed by changing the phosphate ion concentration in the cathodic electrolytic treatment bath.

TABLE 3

| | Sn-plated layer | | Film | | | | Evaluation Discoloration resistance at the time of heating Color difference b* | | |
|---|---|---|---|---|---|---|---|---|---|
| | Sn one surface | Zr | Positional relationship | Element | Positional relationship | | | | |
| No. | adhesion amount (g/m²) | adhesion amount (mg/m²) | between depth position A and depth position B | concentration of Zr at depth position A | between depth position A and depth position C | α/β | Initial | After elapse of time | |
| C1 | 2.8 | 5 | Good | Very Good | Good | 0.8 | 2.8 | 3.3 | |
| C2 | 2.8 | 5 | Good | Very Good | Good | 0.1 | 2.6 | 3.1 | |
| C3 | 2.8 | 5 | Good | Very Good | Good | 0.2 | 2.6 | 3.0 | |
| C4 | 2.8 | 5 | Good | Very Good | Good | 0.4 | 2.6 | 2.9 | |
| C5 | 2.8 | 5 | Good | Very Good | Good | 1.4 | 2.6 | 2.9 | |

TABLE 3-continued

| | | | | | | | | |
|---|---|---|---|---|---|---|---|---|
| C6 | 2.8 | 5 | Good | Very Good | Good | 1.6 | 2.6 | 3.8 |
| C7 | 2.8 | 5 | Good | Very Good | Good | 2.0 | 2.6 | 4.1 |
| C8 | 2.8 | 5 | Good | Very Good | Good | 2.1 | 2.6 | 4.9 |

| | Evaluation | | | | |
|---|---|---|---|---|---|
| | Discoloration resistance at the time of heating | Coating | Sulfide | Corrosion resistance | |
| No. | Color difference b* Δb* | film adhesion | staining resistance | after coating | Remark |
| C1 | 0.5 | Very Good | Very Good | Very Good | Good | Inventive Example |
| C2 | 0.5 | Very Good | Very Good | Good | Fair | Inventive Example |
| C3 | 0.4 | Very Good | Very Good | Good | Good | Inventive Example |
| C4 | 0.3 | Very Good | Very Good | Very Good | Good | Inventive Example |
| C5 | 0.3 | Very Good | Very Good | Very Good | Good | Inventive Example |
| C6 | 1.2 | Good | Very Good | Very Good | Good | Inventive Example |
| C7 | 1.5 | Good | Very Good | Very Good | Good | Inventive Example |
| C8 | 2.3 | Fair | Very Good | Very Good | Good | Inventive Example |

As is clear from Table 3, in Inventive Examples, all evaluation results were good.

Example 4

Tables 4 and 5 show differences in evaluation results due to differences in cleaning treatment conditions. Table 4 shows the manufacturing conditions of each test material, and Table 5 shows the configurations and evaluations of the obtained test materials.

Although the conditions for the anodic electrolytic treatment are not shown in Table 4, in all Inventive Examples and Comparative Examples, the anodic electrolytic treatment was performed under the conditions in which the electrolyte of the anodic electrolytic treatment solution was sodium hydrogen carbonate, the Zr ion concentration of the anodic electrolytic treatment solution was 10 ppm, the pH of the anodic electrolytic treatment solution was 8, the electrical conductivity of the anodic electrolytic treatment solution was 2 S/m, the temperature of the anodic electrolytic treatment solution was 25° C., and the amount of energization of the anodic electrolytic treatment solution was 0.5 C/dm².

TABLE 4

| | Sn-plated layer | | Cathodic electrolytic treatment | | | | | | | Cleaning treatment | | | |
|---|---|---|---|---|---|---|---|---|---|---|---|---|---|
| | Sn one surface | | Composition of electrolytic bath | | | Electrolysis condition | | | | | | | |
| No. | adhesion amount (g/m²) | Heating and melting | Zr ion (ppm) | Phosphate ion (ppm) | Other ions (50 ppm added) | Current density (A/dm²) | Flow velocity (m/min) | pH | Bath temperature (° C.) | Treatment temperature (° C.) | Treatment time (seconds) | pH | Remark |
| D1 | 2.8 | Performed | 1400 | 900 | None | 5 | 400 | 4.0 | 35 | 30 | 0.5 | 6 | Inventive Example |
| D2 | 2.8 | Performed | 1400 | 900 | None | 5 | 500 | 4.0 | 35 | 30 | 0.4 | 6 | Inventive Example |
| D3 | 2.8 | Performed | 1400 | 900 | None | 5 | 600 | 4.0 | 35 | 30 | 0.3 | 6 | Inventive Example |
| D4 | 2.8 | Performed | 1400 | 900 | None | 3.0 | 200 | 4.0 | 35 | 25 | 0.9 | 6 | Inventive Example |
| D5 | 2.8 | Performed | 1400 | 900 | None | 3.0 | 200 | 4.0 | 35 | 45 | 0.9 | 6 | Inventive Example |
| D6 | 2.8 | Performed | 1400 | 900 | None | 3.0 | 200 | 4.0 | 35 | 30 | 0.9 | 4 | Inventive Example |
| D7 | 2.8 | Performed | 1400 | 900 | None | 3.0 | 200 | 4.0 | 35 | 30 | 0.9 | 5 | Inventive Example |
| D8 | 2.8 | Performed | 1400 | 900 | None | 3.0 | 200 | 4.0 | 35 | 30 | 0.9 | 8 | Inventive Example |
| D9 | 2.8 | Performed | 1400 | 900 | None | 3.0 | 200 | 4.0 | 35 | 30 | 0.9 | 9 | Inventive Example |

TABLE 4-continued

| | Sn-plated layer | | Cathodic electrolytic treatment | | | | | | | Cleaning treatment | | | |
|---|---|---|---|---|---|---|---|---|---|---|---|---|---|
| | Sn one surface | | Composition of electrolytic bath | | | Electrolysis condition | | | | | | | |
| No. | adhesion amount (g/m²) | Heating and melting | Zr ion (ppm) | Phosphate ion (ppm) | Other ions (50 ppm added) | Current density (A/dm²) | Flow velocity (m/min) | pH | Bath temperature (° C.) | Treatment temperature (° C.) | Treatment time (seconds) | pH | Remark |
| d1 | 2.8 | Performed | 1400 | 900 | None | 3.0 | 200 | 4.0 | 35 | 20 | 0.9 | 6 | Comparative Example |

TABLE 5

| | Film | | | Evaluation | | | | | | |
|---|---|---|---|---|---|---|---|---|---|---|
| | | | | Discoloration resistance at the time of heating | | | | | Corrosion | |
| | | Positional | | | Color difference b* | | | | | |
| No. | Zr adhesion amount (mg/m²) | relationship between depth position A and depth position B | Element concentration of Zr at depth position A | α/β | Initial | After elapse of time | Δb* | Coating film adhesion | Sulfide staining resistance | resistance after coating | Remark |
| D1 | 4 | Good | Good | 0.7 | 2.8 | 3.6 | 0.8 | Very Good | Very Good | Very Good | Good | Inventive Example |
| D2 | 3 | Good | Good | 0.7 | 2.5 | 3.6 | 1.1 | Good | Very Good | Very Good | Good | Inventive Example |
| D3 | 0.5 | Good | Fair | 0.6 | 2.4 | 3.9 | 1.5 | Good | Very Good | Very Good | Good | Inventive Example |
| D4 | 6 | Good | Very Good | 0.6 | 2.7 | 3.1 | 0.4 | Very Good | Very Good | Very Good | Good | Inventive Example |
| D5 | 5 | Good | Very Good | 0.6 | 2.7 | 3.2 | 0.5 | Very Good | Very Good | Very Good | Good | Inventive Example |
| D6 | 3 | Good | Very Good | 0.6 | 2.6 | 4.0 | 1.4 | Good | Very Good | Very Good | Good | Inventive Example |
| D7 | 5 | Good | Very Good | 0.7 | 2.7 | 3.2 | 0.5 | Very Good | Very Good | Very Good | Good | Inventive Example |
| D8 | 5 | Good | Very Good | 0.6 | 2.7 | 3.1 | 0.4 | Very Good | Very Good | Very Good | Good | Inventive Example |
| D9 | 3 | Good | Very Good | 0.7 | 2.7 | 4.0 | 1.3 | Good | Very Good | Very Good | Good | Inventive Example |
| d1 | 5 | Bad | Very Good | 0.5 | 2.7 | 5.8 | 3.1 | Bad | Very Good | Very Good | Good | Comparative Example |

As is clear from Tables 4 and 5, in all Inventive Examples, all evaluation results were good. On the other hand, the discoloration resistance of the test material manufactured in Comparative Example d1 at the time of heating deteriorated.

Example 5

Tables 6 to 14 show the results in a case where the cathodic treatment conditions, the cleaning treatment conditions, and the anodic treatment conditions are changed. Tables 6 to 11 show the manufacturing conditions of the test material in each example, and Tables 12 to 14 show the configurations and the evaluation results of the obtained test materials.

TABLE 6

| | Sn-plated layer | | Cathodic electrolytic treatment | | | | | | Cleaning treatment | | | |
|---|---|---|---|---|---|---|---|---|---|---|---|---|
| | Sn one surface | | Composition of electrolytic bath | | | Electrolysis conditions | | | | | | |
| No. | adhesion amount (g/m$^2$) | Heating and melting | Zr ions (ppm) | Phosphate ions (ppm) | Other ions (50 ppm added) | Current density (A/dm$^2$) | Flow velocity (m/min) | pH | Bath temperature (° C.) | Treatment temperature (° C.) | Treatment time (seconds) | pH | Remark |
| E1 | 0.05 | Performed | 1400 | 900 | None | 3.0 | 200 | 4.0 | 35 | 30 | 0.9 | 6 | Inventive Example |
| E2 | 0.1 | Performed | 1400 | 900 | None | 3.0 | 200 | 4.0 | 35 | 30 | 0.9 | 6 | Inventive Example |
| E3 | 2.8 | Performed | 1400 | 900 | None | 3.0 | 200 | 4.0 | 35 | 30 | 0.9 | 6 | Inventive Example |
| E4 | 8.4 | Performed | 1400 | 900 | None | 3.0 | 200 | 4.0 | 35 | 30 | 0.9 | 6 | Inventive Example |
| E5 | 15.0 | Performed | 1400 | 900 | None | 3.0 | 200 | 4.0 | 35 | 30 | 0.9 | 6 | Inventive Example |
| E6 | 20.2 | Performed | 1400 | 900 | None | 3.0 | 200 | 4.0 | 35 | 30 | 0.9 | 6 | Inventive Example |
| E7 | 2.8 | Performed | 1400 | 900 | None | 3.0 | 200 | 4.0 | 35 | 30 | 0.9 | 6 | Inventive Example |
| E8 | 2.8 | Performed | 80 | 900 | None | 3.0 | 200 | 4.0 | 35 | 30 | 0.9 | 6 | Inventive Example |
| E9 | 2.8 | Performed | 120 | 900 | None | 3.0 | 200 | 4.0 | 35 | 30 | 0.9 | 6 | Inventive Example |
| E10 | 2.8 | Performed | 500 | 900 | None | 3.0 | 200 | 4.0 | 35 | 30 | 0.9 | 6 | Inventive Example |
| E11 | 2.8 | Performed | 4000 | 900 | None | 3.0 | 200 | 4.0 | 35 | 30 | 0.9 | 6 | Inventive Example |
| E12 | 2.8 | Performed | 5000 | 900 | None | 3.0 | 200 | 4.0 | 35 | 30 | 0.9 | 6 | Inventive Example |
| E13 | 2.8 | Performed | 1400 | 100 | None | 1.0 | 200 | 4.0 | 35 | 30 | 0.9 | 6 | Inventive Example |
| E14 | 2.8 | Performed | 1400 | 300 | None | 1.5 | 200 | 4.0 | 35 | 30 | 0.9 | 6 | Inventive Example |
| E15 | 2.8 | Performed | 1400 | 500 | None | 2.0 | 200 | 4.0 | 35 | 30 | 0.9 | 6 | Inventive Example |
| E16 | 2.8 | Performed | 1400 | 1200 | None | 5.0 | 200 | 4.0 | 35 | 30 | 0.9 | 6 | Inventive Example |
| E17 | 2.8 | Performed | 1400 | 1200 | None | 12 | 200 | 4.0 | 35 | 30 | 0.9 | 6 | Inventive Example |
| E18 | 2.8 | Performed | 1400 | 1800 | None | 40 | 200 | 4.0 | 35 | 30 | 0.9 | 6 | Inventive Example |
| E19 | 2.8 | Performed | 1400 | 3000 | None | 55 | 200 | 4.0 | 35 | 30 | 0.9 | 6 | Inventive Example |
| E20 | 2.8 | Performed | 1400 | 900 | Fe | 3.0 | 200 | 4.0 | 35 | 30 | 0.9 | 6 | Inventive Example |
| E21 | 2.8 | Performed | 1400 | 900 | Ni | 3.0 | 200 | 4.0 | 35 | 30 | 0.9 | 6 | Inventive Example |
| E22 | 2.8 | Performed | 1400 | 900 | Co | 3.0 | 200 | 4.0 | 35 | 30 | 0.9 | 6 | Inventive Example |
| E23 | 2.8 | Performed | 1400 | 900 | Ca | 3.0 | 200 | 4.0 | 35 | 30 | 0.9 | 6 | Inventive Example |
| E24 | 2.8 | Performed | 1400 | 900 | Na | 3.0 | 200 | 4.0 | 35 | 30 | 0.9 | 6 | Inventive Example |
| E25 | 2.8 | Performed | 1400 | 900 | Mg | 3.0 | 200 | 4.0 | 35 | 30 | 0.9 | 6 | Inventive Example |
| E26 | 2.8 | Performed | 1400 | 900 | Al | 3.0 | 200 | 4.0 | 35 | 30 | 0.9 | 6 | Inventive Example |
| E27 | 2.8 | Performed | 1400 | 900 | Si | 3.0 | 200 | 4.0 | 35 | 30 | 0.9 | 6 | Inventive Example |
| E28 | 2.8 | Performed | 1400 | 900 | Fe, Cr, Ca | 3.0 | 200 | 4.0 | 35 | 30 | 0.9 | 6 | Inventive Example |
| E29 | 2.8 | Performed | 1400 | 900 | None | 0.03 | 200 | 4.0 | 35 | 30 | 0.9 | 6 | Inventive Example |
| E30 | 2.8 | Performed | 1400 | 900 | None | 0.05 | 200 | 4.0 | 35 | 30 | 0.9 | 6 | Inventive Example |
| E31 | 2.8 | Performed | 1400 | 900 | None | 1 | 200 | 4.0 | 35 | 30 | 0.9 | 6 | Inventive Example |
| E32 | 2.8 | Performed | 1400 | 900 | None | 3 | 200 | 4.0 | 35 | 30 | 0.9 | 6 | Inventive Example |
| E33 | 2.8 | Performed | 1400 | 900 | None | 5 | 200 | 4.0 | 35 | 30 | 0.9 | 6 | Inventive Example |

TABLE 6-continued

| | Sn-plated layer | | Cathodic electrolytic treatment | | | | | | | Cleaning treatment | | | |
|---|---|---|---|---|---|---|---|---|---|---|---|---|---|
| | Sn one surface | | Composition of electrolytic bath | | | Electrolysis conditions | | | | | | | |
| No. | adhesion amount (g/m$^2$) | Heating and melting | Zr ions (ppm) | Phosphate ions (ppm) | Other ions (50 ppm added) | Current density (A/dm$^2$) | Flow velocity (m/min) | pH | Bath temperature (° C.) | Treatment temperature (° C.) | Treatment time (seconds) | pH | Remark |
| E34 | 2.8 | Performed | 1400 | 900 | None | 8 | 200 | 4.0 | 35 | 30 | 0.9 | 6 | Inventive Example |
| E35 | 2.8 | Performed | 1400 | 900 | None | 10 | 200 | 4.0 | 35 | 30 | 0.9 | 6 | Inventive Example |

TABLE 7

| | Sn-plated layer | | Cathodic electrolytic treatment | | | | | | | Cleaning treatment | | | |
|---|---|---|---|---|---|---|---|---|---|---|---|---|---|
| | Sn one surface | | Composition of electrolytic bath | | | Electrolysis conditions | | | | | | | |
| No. | adhesion amount (g/m$^2$) | Heating and melting | Zr ions (ppm) | Phosphate ions (ppm) | Other ions (50 ppm added) | Current density (A/dm$^2$) | Flow velocity (m/min) | pH | Bath temperature (° C.) | Treatment temperature (° C.) | Treatment time (seconds) | pH | Remark |
| E36 | 2.8 | Performed | 1400 | 900 | None | 16 | 200 | 4.0 | 35 | 30 | 0.9 | 6 | Inventive Example |
| E37 | 2.8 | Performed | 1400 | 900 | None | 44 | 200 | 4.0 | 35 | 30 | 0.9 | 6 | Inventive Example |
| E38 | 2.8 | Performed | 1400 | 900 | None | 55 | 200 | 4.0 | 35 | 30 | 0.9 | 6 | Inventive Example |
| E39 | 2.8 | Performed | 1400 | 900 | None | 4 | 400 | 4.0 | 35 | 30 | 0.5 | 6 | Inventive Example |
| E40 | 2.8 | Performed | 1400 | 900 | None | 8 | 400 | 4.0 | 35 | 30 | 0.5 | 6 | Inventive Example |
| E41 | 2.8 | Performed | 1400 | 900 | None | 10 | 400 | 4.0 | 35 | 30 | 0.5 | 6 | Inventive Example |
| E42 | 2.8 | Performed | 1400 | 900 | None | 12 | 400 | 4.0 | 35 | 30 | 0.5 | 6 | Inventive Example |
| E43 | 2.8 | Performed | 1400 | 900 | None | 5 | 30 | 4.0 | 35 | 30 | 6.0 | 6 | Inventive Example |
| E44 | 2.8 | Performed | 1400 | 900 | None | 5 | 50 | 4.0 | 35 | 30 | 3.6 | 6 | Inventive Example |
| F45 | 2.8 | Performed | 1400 | 900 | None | 5 | 400 | 4.0 | 35 | 30 | 0.5 | 6 | Inventive Example |
| E46 | 2.8 | Performed | 1400 | 900 | None | 5 | 500 | 4.0 | 35 | 30 | 0.4 | 6 | Inventive Example |
| E47 | 2.8 | Performed | 1400 | 900 | None | 5 | 600 | 4.0 | 35 | 30 | 0.3 | 6 | Inventive Example |
| E48 | 2.8 | Performed | 1400 | 900 | None | 3.0 | 200 | 2.8 | 35 | 30 | 0.9 | 6 | Inventive Example |
| E49 | 2.8 | Performed | 1400 | 900 | None | 3.0 | 200 | 3.2 | 35 | 30 | 0.9 | 6 | Inventive Example |
| E50 | 2.8 | Performed | 1400 | 900 | None | 3.0 | 200 | 4.8 | 35 | 30 | 0.9 | 6 | Inventive Example |
| E51 | 2.8 | Performed | 1400 | 900 | None | 3.0 | 200 | 5.2 | 35 | 30 | 0.9 | 6 | Inventive Example |
| E52 | 2.8 | Performed | 1400 | 900 | None | 3.0 | 200 | 4.0 | 8 | 30 | 0.9 | 6 | Inventive Example |
| E53 | 2.8 | Performed | 1400 | 900 | None | 3.0 | 200 | 4.0 | 10 | 30 | 0.9 | 6 | Inventive Example |
| E54 | 2.8 | Performed | 1400 | 900 | None | 3.0 | 200 | 4.0 | 50 | 30 | 0.9 | 6 | Inventive Example |
| E55 | 2.8 | Performed | 1400 | 900 | None | 3.0 | 200 | 4.0 | 55 | 30 | 0.9 | 6 | Inventive Example |
| F56 | 2.8 | Performed | 1400 | 900 | None | 3.0 | 200 | 4.0 | 35 | 25 | 0.9 | 6 | Inventive Example |
| E57 | 2.8 | Performed | 1400 | 900 | None | 3.0 | 200 | 4.0 | 35 | 45 | 0.9 | 6 | Inventive Example |
| E58 | 2.8 | Performed | 1400 | 900 | None | 3.0 | 200 | 4.0 | 35 | 60 | 0.9 | 6 | Inventive Example |
| E59 | 2.8 | Performed | 1400 | 900 | None | 3.0 | 200 | 4.0 | 35 | 30 | 0.9 | 4 | Inventive Example |
| E60 | 2.8 | Performed | 1400 | 900 | None | 3.0 | 200 | 4.0 | 35 | 30 | 0.9 | 5 | Inventive Example |

TABLE 7-continued

| | Sn-plated layer | | Cathodic electrolytic treatment | | | | | | | Cleaning treatment | | | |
|---|---|---|---|---|---|---|---|---|---|---|---|---|---|
| | Sn one surface | | Composition of electrolytic bath | | | Electrolysis conditions | | | | | | | |
| No. | adhesion amount (g/m²) | Heating and melting | Zr ions (ppm) | Phosphate ions (ppm) | Other ions (50 ppm added) | Current density (A/dm²) | Flow velocity (m/min) | pH | Bath temperature (° C.) | Treatment temperature (° C.) | Treatment time (seconds) | pH | Remark |
| E61 | 2.8 | Performed | 1400 | 900 | None | 3.0 | 200 | 4.0 | 35 | 30 | 0.9 | 8 | Inventive Example |
| E62 | 2.8 | Performed | 1400 | 900 | None | 3.0 | 200 | 4.0 | 35 | 30 | 0.9 | 9 | Inventive Example |
| E63 | 2.8 | Performed | 1400 | 900 | None | 3.0 | 200 | 4.0 | 35 | 30 | 0.9 | 6 | Inventive Example |
| E64 | 2.8 | Performed | 1400 | 900 | None | 3.0 | 200 | 4.0 | 35 | 30 | 0.9 | 6 | Inventive Example |
| E65 | 2.8 | Performed | 1400 | 900 | None | 3.0 | 200 | 4.0 | 35 | 30 | 0.9 | 6 | Inventive Example |
| E66 | 2.8 | Performed | 1400 | 900 | None | 3.0 | 200 | 4.0 | 35 | 30 | 0.9 | 6 | Inventive Example |
| E67 | 2.8 | Performed | 1400 | 900 | None | 3.0 | 200 | 4.0 | 35 | 30 | 0.9 | 6 | Inventive Example |
| E68 | 2.8 | Performed | 1400 | 900 | None | 3.0 | 200 | 4.0 | 35 | 30 | 0.9 | 6 | Inventive Example |
| E69 | 2.8 | Performed | 1400 | 900 | None | 3.0 | 200 | 4.0 | 35 | 30 | 0.9 | 6 | Inventive Example |
| E70 | 2.8 | Performed | 1400 | 900 | None | 3.0 | 200 | 4.0 | 35 | 30 | 0.9 | 6 | Inventive Example |

TABLE 8

| | Sn-plated layer | | Cathodic electrolytic treatment | | | | | | | Cleaning treatment | | | |
|---|---|---|---|---|---|---|---|---|---|---|---|---|---|
| | Sn one surface | | Composition of electrolytic bath | | | Electrolysis conditions | | | | | | | |
| No. | adhesion amount (g/m²) | Heating and melting | Zr ions (ppm) | Phosphate ions (ppm) | Other ions (50 ppm added) | Current density (A/dm²) | Flow velocity (m/min) | pH | Bath temperature (° C.) | Treatment temperature (° C.) | Treatment time (seconds) | pH | Remark |
| E71 | 2.8 | Performed | 1400 | 900 | None | 3.0 | 200 | 4.0 | 35 | 30 | 0.9 | 6 | Inventive Example |
| E72 | 2.8 | Performed | 1400 | 900 | None | 3.0 | 200 | 4.0 | 35 | 30 | 0.9 | 6 | Inventive Example |
| E73 | 2.8 | Performed | 1400 | 900 | None | 3.0 | 200 | 4.0 | 35 | 30 | 0.9 | 6 | Inventive Example |
| E74 | 2.8 | Performed | 1400 | 900 | None | 3.0 | 200 | 4.0 | 35 | 30 | 0.9 | 6 | Inventive Example |
| E75 | 2.8 | Performed | 1400 | 900 | None | 3.0 | 200 | 4.0 | 35 | 30 | 0.9 | 6 | Inventive Example |
| E76 | 2.8 | Performed | 1400 | 900 | None | 3.0 | 200 | 4.0 | 35 | 30 | 0.9 | 6 | Inventive Example |
| E77 | 2.8 | Performed | 1400 | 900 | None | 3.0 | 200 | 4.0 | 35 | 30 | 0.9 | 6 | Inventive Example |
| E78 | 2.8 | Performed | 1400 | 900 | None | 3.0 | 200 | 4.0 | 35 | 30 | 0.9 | 6 | Inventive Example |
| E79 | 2.8 | Performed | 1400 | 900 | None | 3.0 | 200 | 4.0 | 35 | 30 | 0.9 | 6 | Inventive Example |
| E80 | 2.8 | Performed | 1400 | 900 | None | 3.0 | 200 | 4.0 | 35 | 30 | 0.9 | 6 | Inventive Example |
| E81 | 2.8 | Performed | 1400 | 900 | None | 3.0 | 200 | 4.0 | 35 | 30 | 0.9 | 6 | Inventive Example |
| E82 | 2.8 | Performed | 1400 | 900 | None | 3.0 | 200 | 4.0 | 35 | 30 | 0.9 | 6 | Inventive Example |
| E83 | 2.8 | Performed | 1400 | 900 | None | 3.0 | 200 | 4.0 | 35 | 30 | 0.9 | 6 | Inventive Example |
| E84 | 2.8 | Performed | 1400 | 900 | None | 3.0 | 200 | 4.0 | 35 | 30 | 0.9 | 6 | Inventive Example |
| E85 | 2.8 | Performed | 1400 | 900 | None | 3.0 | 200 | 4.0 | 35 | 30 | 0.9 | 6 | Inventive Example |
| E86 | 2.8 | Performed | 1400 | 900 | None | 3.0 | 200 | 4.0 | 35 | 30 | 0.9 | 6 | Inventive Example |
| E87 | 2.8 | Performed | 1400 | 900 | None | 3.0 | 200 | 4.0 | 35 | 30 | 0.9 | 6 | Inventive Example |

TABLE 8-continued

| | Sn-plated layer | | Cathodic electrolytic treatment | | | | | | | Cleaning treatment | | | |
|---|---|---|---|---|---|---|---|---|---|---|---|---|---|
| | Sn one surface | | Composition of electrolytic bath | | | Electrolysis conditions | | | | | | | |
| No. | adhesion amount (g/m²) | Heating and melting | Zr ions (ppm) | Phosphate ions (ppm) | Other ions (50 ppm added) | Current density (A/dm²) | Flow velocity (m/min) | pH | Bath temperature (° C.) | Treatment temperature (° C.) | Treatment time (seconds) | pH | Remark |
| E88 | 2.8 | Performed | 1400 | 900 | None | 3.0 | 200 | 4.0 | 35 | 30 | 0.9 | 6 | Inventive Example |
| E89 | 2.8 | Performed | 1400 | 900 | None | 3.0 | 200 | 4.0 | 35 | 30 | 0.9 | 6 | Inventive Example |
| E90 | 2.8 | Performed | 1400 | 1800 | None | 0.5 | 2 | 4.0 | 35 | 30 | 90.0 | 6 | Inventive Example |
| E91 | 2.8 | Performed | 1400 | 1800 | None | 1.0 | 5 | 4.0 | 35 | 30 | 36.0 | 6 | Inventive Example |
| E92 | 2.8 | Performed | 1400 | 1800 | None | 2.0 | 10 | 4.0 | 35 | 30 | 18.0 | 6 | Inventive Example |
| E93 | 2.8 | Performed | 1400 | 900 | None | 3.0 | 350 | 4.0 | 35 | 30 | 0.5 | 6 | Inventive Example |
| E94 | 2.8 | Performed | 1400 | 900 | None | 3.0 | 200 | 4.0 | 35 | 30 | 0.9 | 6 | Inventive Example |
| E95 | 2.8 | Performed | 1400 | 900 | None | 3.0 | 200 | 4.0 | 35 | 30 | 0.9 | 6 | Inventive Example |
| E96 | 2.8 | Performed | 1400 | 900 | None | 3.0 | 200 | 4.0 | 35 | 30 | 0.9 | 6 | Inventive Example |
| E97 | 2.8 | Performed | 1400 | 900 | None | 3.0 | 200 | 4.0 | 35 | 30 | 0.9 | 6 | Inventive Example |
| E98 | 2.8 | Performed | 1400 | 900 | None | 3.0 | 200 | 4.0 | 35 | 30 | 0.9 | 6 | Inventive Example |
| E99 | 2.8 | Performed | 1400 | 900 | None | 3.0 | 200 | 4.0 | 35 | 30 | 0.9 | 6 | Inventive Example |
| E100 | 2.8 | Performed | 1400 | 900 | None | 3.0 | 200 | 4.0 | 35 | 30 | 0.9 | 6 | Inventive Example |
| e1 | 2.8 | Performed | 1400 | 900 | None | 3.0 | 200 | 4.0 | 35 | 20 | 0.9 | 6 | Comparative Example |
| e2 | 2.8 | Performed | 1400 | 900 | None | 3.0 | 200 | 4.0 | 35 | No cleaning treatment | | | Comparative Example |
| e3 | 2.8 | Performed | 1400 | 900 | None | 3.0 | 200 | 4.0 | 35 | 30 | 0.9 | 6 | Comparative Example |
| e4 | 2.8 | Performed | 1400 | 900 | None | 0.03 | 200 | 2.0 | 35 | No cleaning treatment | | | Comparative Example |
| e5 | 2.8 | Performed | 1400 | 900 | None | 50.0 | 200 | 5.0 | 35 | No cleaning treatment | | | Comparative Example |

TABLE 9

| | Anodic electrolytic treatment | | | | | | | |
|---|---|---|---|---|---|---|---|---|
| | Composition of electrolytic bath | | | Electrolysis conditions | | | | |
| No. | Kind of electrolyte | Zr ion concentration (ppm) | pH | Electrical conductivity (S/m) | Amount of electricity (C/dm²) | Current density (A/dm²) | Bath temperature (° C.) | Remark |
| E1 | Sodium hydrogen carbonate | 10 | 8 | 2.0 | 0.5 | 0.56 | 25 | Inventive Example |
| E2 | Sodium hydrogen carbonate | 10 | 8 | 2.0 | 0.5 | 0.56 | 25 | Inventive Example |
| E3 | Sodium hydrogen carbonate | 10 | 8 | 2.0 | 0.5 | 0.56 | 25 | Inventive Example |
| E4 | Sodium hydrogen carbonate | 10 | 8 | 2.0 | 0.5 | 0.56 | 25 | Inventive Example |
| E5 | Sodium hydrogen carbonate | 10 | 8 | 2.0 | 0.5 | 0.56 | 25 | Inventive Example |
| E6 | Sodium hydrogen carbonate | 10 | 8 | 2.0 | 0.5 | 0.56 | 25 | Inventive Example |
| E7 | Sodium hydrogen carbonate | 10 | 8 | 2.0 | 0.5 | 0.56 | 25 | Inventive Example |
| E8 | Sodium hydrogen carbonate | 10 | 8 | 2.0 | 0.5 | 0.56 | 25 | Inventive Example |
| E9 | Sodium hydrogen carbonate | 10 | 8 | 2.0 | 0.5 | 0.56 | 25 | Inventive Example |
| E10 | Sodium hydrogen carbonate | 10 | 8 | 2.0 | 0.5 | 0.56 | 25 | Inventive Example |

TABLE 9-continued

| | Anodic electrolytic treatment | | | | | | | |
|---|---|---|---|---|---|---|---|---|
| | Composition of electrolytic bath | | | | Electrolysis conditions | | | |
| No. | Kind of electrolyte | Zr ion concentration (ppm) | pH | Electrical conductivity (S/m) | Amount of electricity (C/dm$^2$) | Current density (A/dm$^2$) | Bath temperature (° C.) | Remark |
| E11 | Sodium hydrogen carbonate | 10 | 8 | 2.0 | 0.5 | 0.56 | 25 | Inventive Example |
| E12 | Sodium hydrogen carbonate | 10 | 8 | 2.0 | 0.5 | 0.56 | 25 | Inventive Example |
| E13 | Sodium hydrogen carbonate | 10 | 8 | 2.0 | 0.5 | 0.56 | 25 | Inventive Example |
| E14 | Sodium hydrogen carbonate | 10 | 8 | 2.0 | 0.5 | 0.56 | 25 | Inventive Example |
| E15 | Sodium hydrogen carbonate | 10 | 8 | 2.0 | 0.5 | 0.56 | 25 | Inventive Example |
| E16 | Sodium hydrogen carbonate | 10 | 8 | 2.0 | 0.5 | 0.56 | 25 | Inventive Example |
| E17 | Sodium hydrogen carbonate | 10 | 8 | 2.0 | 0.5 | 0.56 | 25 | Inventive Example |
| E18 | Sodium hydrogen carbonate | 10 | 8 | 2.0 | 0.5 | 0.56 | 25 | Inventive Example |
| E19 | Sodium hydrogen carbonate | 10 | 8 | 2.0 | 0.5 | 0.56 | 25 | Inventive Example |
| E20 | Sodium hydrogen carbonate | 10 | 8 | 2.0 | 0.5 | 0.56 | 25 | Inventive Example |
| E21 | Sodium hydrogen carbonate | 10 | 8 | 2.0 | 0.5 | 0.56 | 25 | Inventive Example |
| E22 | Sodium hydrogen carbonate | 10 | 8 | 2.0 | 0.5 | 0.56 | 25 | Inventive Example |
| E23 | Sodium hydrogen carbonate | 10 | 8 | 2.0 | 0.5 | 0.56 | 25 | Inventive Example |
| E24 | Sodium hydrogen carbonate | 10 | 8 | 2.0 | 0.5 | 0.56 | 25 | Inventive Example |
| E25 | Sodium hydrogen carbonate | 10 | 8 | 2.0 | 0.5 | 0.56 | 25 | Inventive Example |
| E26 | Sodium hydrogen carbonate | 10 | 8 | 2.0 | 0.5 | 0.56 | 25 | Inventive Example |
| E27 | Sodium hydrogen carbonate | 10 | 8 | 2.0 | 0.5 | 0.56 | 25 | Inventive Example |
| E28 | Sodium hydrogen carbonate | 10 | 8 | 2.0 | 0.5 | 0.56 | 25 | Inventive Example |
| E29 | Sodium hydrogen carbonate | 10 | 8 | 2.0 | 0.5 | 0.56 | 25 | Inventive Example |
| E30 | Sodium hydrogen carbonate | 10 | 8 | 2.0 | 0.5 | 0.56 | 25 | Inventive Example |
| E31 | Sodium hydrogen carbonate | 10 | 8 | 2.0 | 0.5 | 0.56 | 25 | Inventive Example |
| E32 | Sodium hydrogen carbonate | 10 | 8 | 2.0 | 0.5 | 0.56 | 25 | Inventive Example |
| E33 | Sodium hydrogen carbonate | 10 | 8 | 2.0 | 0.5 | 0.56 | 25 | Inventive Example |
| E34 | Sodium hydrogen carbonate | 10 | 8 | 2.0 | 0.5 | 0.56 | 25 | Inventive Example |
| E35 | Sodium hydrogen carbonate | 10 | 8 | 2.0 | 0.5 | 0.56 | 25 | Inventive Example |

TABLE 10

| | Anodic electrolytic treatment | | | | | | | |
|---|---|---|---|---|---|---|---|---|
| | Composition of electrolytic bath | | | | Electrolysis conditions | | | |
| No. | Kind of electrolyte | Zr ion concentration (ppm) | pH | Electrical conductivity (S/m) | Amount of electricity (C/dm$^2$) | Current density (A/dm$^2$) | Bath temperature (° C.) | Remark |
| E36 | Sodium hydrogen carbonate | 10 | 8 | 2.0 | 0.5 | 0.56 | 25 | Inventive Example |
| E37 | Sodium hydrogen carbonate | 10 | 8 | 2.0 | 0.5 | 0.56 | 25 | Inventive Example |
| E38 | Sodium hydrogen carbonate | 10 | 8 | 2.0 | 0.5 | 0.56 | 25 | Inventive Example |
| E39 | Sodium hydrogen carbonate | 10 | 8 | 2.0 | 0.5 | 1.11 | 25 | Inventive Example |

TABLE 10-continued

| | Anodic electrolytic treatment | | | | | | |
|---|---|---|---|---|---|---|---|
| | Composition of electrolytic bath | | | Electrolysis conditions | | | |
| No. | Kind of electrolyte | Zr ion concentration (ppm) | pH | Electrical conductivity (S/m) | Amount of electricity (C/dm$^2$) | Current density (A/dm$^2$) | Bath temperature (° C.) | Remark |
|---|---|---|---|---|---|---|---|---|
| E40 | Sodium hydrogen carbonate | 10 | 8 | 2.0 | 0.5 | 1.11 | 25 | Inventive Example |
| E41 | Sodium hydrogen carbonate | 10 | 8 | 2.0 | 0.5 | 1.11 | 25 | Inventive Example |
| E42 | Sodium hydrogen carbonate | 10 | 8 | 2.0 | 0.5 | 1.11 | 25 | Inventive Example |
| E43 | Sodium hydrogen carbonate | 10 | 8 | 2.0 | 0.5 | 0.08 | 25 | Inventive Example |
| E44 | Sodium hydrogen carbonate | 10 | 8 | 2.0 | 0.5 | 0.14 | 25 | Inventive Example |
| E45 | Sodium hydrogen carbonate | 10 | 8 | 2.0 | 0.5 | 1.11 | 25 | Inventive Example |
| E46 | Sodium hydrogen carbonate | 10 | 8 | 2.0 | 0.5 | 1.39 | 25 | Inventive Example |
| E47 | Sodium hydrogen carbonate | 10 | 8 | 2.0 | 0.5 | 1.67 | 25 | Inventive Example |
| E48 | Sodium hydrogen carbonate | 10 | 8 | 2.0 | 0.5 | 0.56 | 25 | Inventive Example |
| E49 | Sodium hydrogen carbonate | 10 | 8 | 2.0 | 0.5 | 0.56 | 25 | Inventive Example |
| E50 | Sodium hydrogen carbonate | 10 | 8 | 2.0 | 0.5 | 0.56 | 25 | Inventive Example |
| E51 | Sodium hydrogen carbonate | 10 | 8 | 2.0 | 0.5 | 0.56 | 25 | Inventive Example |
| E52 | Sodium hydrogen carbonate | 10 | 8 | 2.0 | 0.5 | 0.56 | 25 | Inventive Example |
| E53 | Sodium hydrogen carbonate | 10 | 8 | 2.0 | 0.5 | 0.56 | 25 | Inventive Example |
| E54 | Sodium hydrogen carbonate | 10 | 8 | 2.0 | 0.5 | 0.56 | 25 | Inventive Example |
| E55 | Sodium hydrogen carbonate | 10 | 8 | 2.0 | 0.5 | 0.56 | 25 | Inventive Example |
| E56 | Sodium hydrogen carbonate | 10 | 8 | 2.0 | 0.5 | 0.56 | 25 | Inventive Example |
| E57 | Sodium hydrogen carbonate | 10 | 8 | 2.0 | 0.5 | 0.56 | 25 | Inventive Example |
| E58 | Sodium hydrogen carbonate | 10 | 8 | 2.0 | 0.5 | 0.56 | 25 | Inventive Example |
| E59 | Sodium hydrogen carbonate | 10 | 8 | 2.0 | 0.5 | 0.56 | 25 | Inventive Example |
| E60 | Sodium hydrogen carbonate | 10 | 8 | 2.0 | 0.5 | 0.56 | 25 | Inventive Example |
| E61 | Sodium hydrogen carbonate | 10 | 8 | 2.0 | 0.5 | 0.56 | 25 | Inventive Example |
| E62 | Sodium hydrogen carbonate | 10 | 8 | 2.0 | 0.5 | 0.56 | 25 | Inventive Example |
| E63 | Sodium carbonate | 10 | 11 | 2.0 | 0.5 | 0.56 | 25 | Inventive Example |
| E64 | Sodium carbonate | 10 | 11 | 2.0 | 0.5 | 0.56 | 25 | Inventive Example |
| E65 | Sodium diphosphate | 10 | 10 | 2.0 | 0.5 | 0.56 | 25 | Inventive Example |
| E66 | Sodium diphosphate | 10 | 10 | 2.0 | 0.5 | 0.56 | 25 | Inventive Example |
| E67 | Trisodium citrate | 10 | 9 | 2.0 | 0.5 | 0.56 | 25 | Inventive Example |
| E68 | Trisodium citrate | 10 | 9 | 2.0 | 0.5 | 0.56 | 25 | Inventive Example |
| E69 | Ammonium monotartrate | 10 | 6 | 2.0 | 0.5 | 0.56 | 25 | Inventive Example |
| E70 | Ammonium monotartrate | 10 | 6 | 2.0 | 0.5 | 0.56 | 25 | Inventive Example |

TABLE 11

| | Anodic electrolytic treatment | | | | | | | |
|---|---|---|---|---|---|---|---|---|
| | Composition of electrolytic bath | | | | Electrolysis conditions | | | |
| No. | Kind of electrolyte | Zr ion concentration (ppm) | pH | Electrical conductivity (S/m) | Amount of electricity (C/dm$^2$) | Current density (A/dm$^2$) | Bath temperature (° C.) | Remark |
| E71 | Sodium sulfate | 10 | 7 | 2.0 | 0.5 | 0.56 | 25 | Inventive Example |
| E72 | Sodium sulfate | 10 | 7 | 2.0 | 0.5 | 0.56 | 25 | Inventive Example |
| E73 | Phosphoric acid | 10 | 2 | 2.0 | 0.5 | 0.56 | 25 | Inventive Example |
| E74 | Phosphoric acid | 10 | 2 | 2.0 | 0.5 | 0.56 | 25 | Inventive Example |
| E75 | Sodium hydrogen carbonate | 10 | 8 | 0.3 | 0.5 | 0.56 | 25 | Inventive Example |
| E76 | Sodium hydrogen carbonate | 10 | 8 | 0.5 | 0.5 | 0.56 | 25 | Inventive Example |
| E77 | Sodium hydrogen carbonate | 10 | 8 | 1.0 | 0.5 | 0.56 | 25 | Inventive Example |
| E78 | Sodium hydrogen carbonate | 10 | 8 | 2.5 | 0.5 | 0.56 | 25 | Inventive Example |
| E79 | Sodium hydrogen carbonate | 10 | 8 | 3.0 | 0.5 | 0.56 | 25 | Inventive Example |
| E80 | Sodium hydrogen carbonate | 10 | 8 | 4.0 | 0.5 | 0.56 | 25 | Inventive Example |
| E81 | Sodium hydrogen carbonate | 10 | 8 | 4.5 | 0.5 | 0.56 | 25 | Inventive Example |
| E82 | Sodium hydrogen carbonate | 10 | 8 | 2.0 | 0.05 | 0.06 | 25 | Inventive Example |
| E83 | Sodium hydrogen carbonate | 10 | 8 | 2.0 | 0.1 | 0.11 | 25 | Inventive Example |
| E84 | Sodium hydrogen carbonate | 10 | 8 | 2.0 | 0.2 | 0.22 | 25 | Inventive Example |
| E85 | Sodium hydrogen carbonate | 10 | 8 | 2.0 | 0.7 | 0.78 | 25 | Inventive Example |
| E86 | Sodium hydrogen carbonate | 10 | 8 | 2.0 | 1 | 1.1 | 25 | Inventive Example |
| E87 | Sodium hydrogen carbonate | 10 | 8 | 2.0 | 2 | 2.2 | 25 | Inventive Example |
| E88 | Sodium hydrogen carbonate | 10 | 8 | 2.0 | 10 | 11.1 | 25 | Inventive Example |
| E89 | Sodium hydrogen cartonate | 10 | 8 | 2.0 | 12 | 13.3 | 25 | Inventive Example |
| E90 | Sodium hydrogen carbonate | 10 | 8 | 2.0 | 6.4 | 0.07 | 25 | Inventive Example |
| E91 | Sodium hydrogen carbonate | 10 | 8 | 2.0 | 6.4 | 0.18 | 25 | Inventive Example |
| E92 | Sodium hydrogen carbonate | 10 | 8 | 2.0 | 6.4 | 0.36 | 25 | Inventive Example |
| E93 | Sodium hydrogen carbonate | 10 | 8 | 2.0 | 6.4 | 12.4 | 25 | Inventive Example |
| E94 | Sodium hydrogen carbonate | 10 | 8 | 2.0 | 0.5 | 0.56 | 3 | Inventive Example |
| E95 | Sodium hydrogen carbonate | 10 | 8 | 2.0 | 0.5 | 0.56 | 5 | Inventive Example |
| E96 | Sodium hydrogen carbonate | 10 | 8 | 2.0 | 0.5 | 0.56 | 15 | Inventive Example |
| E97 | Sodium hydrogen carbonate | 10 | 8 | 2.0 | 0.5 | 0.56 | 35 | Inventive Example |
| E98 | Sodium hydrogen carbonate | 10 | 8 | 2.0 | 0.5 | 0.56 | 50 | Inventive Example |
| E99 | Sodium hydrogen carbonate | 10 | 8 | 2.0 | 0.5 | 0.56 | 60 | Inventive Example |
| E100 | Sodium hydrogen carbonate | 10 | 8 | 2.0 | 0.5 | 0.56 | 65 | Inventive Example |
| e1 | Sodium hydrogen carbonate | 10 | 8 | 2.0 | 0.5 | 0.56 | 25 | Comparative Example |
| e2 | Sodium hydrogen carbonate | 10 | 8 | 2.0 | 1.6 | 1.78 | 25 | Comparative Example |
| e3 | No anodic electrolytic treatment | | | | | | | Comparative Example |
| e4 | Sodium hydrogen carbonate | 10 | 8 | 2.0 | 1.6 | 1.78 | 25 | Comparative Example |
| e5 | No anodic electrolytic treatment | | | | | | | Comparative Example |

TABLE 12

| | Film | | | | Evaluation | | | | | | |
|---|---|---|---|---|---|---|---|---|---|---|---|
| | | Positional | | | Discoloration resistance at the time of heating | | | | | Corrosion | |
| | Zr | relationship | Element | | Color difference b* | | | | Sulfide | resistance | |
| | adhesion | between depth | concentration | | | After | | Coating | staining | after | |
| | amount | position A and | of Zr at depth | | | elapse of | | film | resistance | coating | |
| No. | (mg/m²) | depth position B | position A | α/β | Initial | time | Δb* | adhesion | | | Remark |
| E1 | 4 | Good | Very Good | 0.8 | 2.2 | 2.6 | 0.4 | Very Good | Good | Good | Good | Inventive Example |
| E2 | 4 | Good | Very Good | 0.8 | 2.1 | 2.5 | 0.4 | Very Good | Very Good | Very Good | Fair | Inventive Example |
| E3 | 5 | Good | Very Good | 0.8 | 2.8 | 3.3 | 0.5 | Very Good | Very Good | Very Good | Good | Inventive Example |
| E4 | 5 | Good | Very Good | 0.7 | 2.9 | 3.4 | 0.5 | Very Good | Very Good | Good | Good | Inventive Example |
| E5 | 4 | Good | Very Good | 0.7 | 3.2 | 3.8 | 0.6 | Very Good | Good | Good | Good | Inventive Example |
| E6 | 4 | Good | Very Good | 0.7 | 3.4 | 4.6 | 1.2 | Good | Good | Good | Good | Inventive Example |
| E7 | 4 | Good | Very Good | 0.6 | 3.4 | 4.1 | 0.7 | Very Good | Good | Good | Fair | Inventive Example |
| E8 | 0.2 | Good | Fair | 0.8 | 2.2 | 4.4 | 2.2 | Fair | Very Good | Good | Fair | Inventive Example |
| E9 | 1.1 | Good | Good | 0.7 | 2.3 | 3.7 | 1.4 | Fair | Very Good | Good | Good | Inventive Example |
| E10 | 2.2 | Good | Very Good | 0.6 | 2.8 | 3.3 | 0.5 | Very Good | Very Good | Very Good | Good | Inventive Example |
| E11 | 10 | Good | Very Good | 0.6 | 2.8 | 3.3 | 0.5 | Very Good | Very Good | Very Good | Good | Inventive Example |
| E12 | 12 | Good | Very Good | 0.7 | 2.9 | 3.4 | 0.5 | Very Good | Good | Very Good | Good | Inventive Example |
| E13 | 5 | Good | Very Good | 0.1 | 2.6 | 3.1 | 0.5 | Very Good | Very Good | Good | Fair | Inventive Example |
| E14 | 5 | Good | Very Good | 0.2 | 2.6 | 3.0 | 0.4 | Very Good | Very Good | Good | Good | Inventive Example |
| E15 | 5 | Good | Very Good | 0.4 | 2.6 | 2.9 | 0.3 | Very Good | Very Good | Very Good | Good | Inventive Example |
| E16 | 5 | Good | Very Good | 1.4 | 2.6 | 2.9 | 0.3 | Very Good | Very Good | Very Good | Good | Inventive Example |
| E17 | 5 | Good | Very Good | 1.6 | 2.6 | 3.8 | 1.2 | Good | Very Good | Very Good | Good | Inventive Example |
| E18 | 5 | Good | Very Good | 2.0 | 2.6 | 4.1 | 1.5 | Good | Very Good | Very Good | Good | Inventive Example |
| E19 | 5 | Good | Very Good | 2.1 | 2.6 | 4.9 | 2.3 | Fair | Very Good | Very Good | Good | Inventive Example |
| E20 | 5 | Good | Very Good | 0.6 | 2.6 | 2.9 | 0.3 | Very Good | Very Good | Good | Good | Inventive Example |
| E21 | 4 | Good | Very Good | 0.7 | 2.7 | 3.1 | 0.4 | Very Good | Very Good | Very Good | Good | Inventive Example |
| E22 | 5 | Good | Very Good | 0.8 | 2.6 | 2.9 | 0.3 | Very Good | Very Good | Good | Good | Inventive Example |
| E23 | 5 | Good | Very Good | 0.7 | 2.6 | 3.0 | 0.4 | Very Good | Very Good | Very Good | Good | Inventive Example |
| E24 | 4 | Good | Very Good | 0.6 | 2.7 | 3.1 | 0.4 | Very Good | Very Good | Good | Good | Inventive Example |
| E25 | 4 | Good | Very Good | 0.8 | 2.8 | 3.2 | 0.4 | Very Good | Very Good | Very Good | Good | Inventive Example |
| E26 | 5 | Good | Very Good | 0.6 | 2.8 | 3.1 | 0.3 | Very Good | Very Good | Good | Good | Inventive Example |
| E27 | 4 | Good | Very Good | 0.7 | 2.6 | 2.9 | 0.3 | Very Good | Very Good | Very Good | Good | Inventive Example |
| E28 | 5 | Good | Very Good | 0.7 | 2.7 | 3.0 | 0.3 | Very Good | Very Good | Very Good | Good | Inventive Example |
| E29 | 0.2 | Good | Fair | 0.8 | 2.9 | 3.2 | 0.3 | Very Good | Very Good | Good | Fair | Inventive Example |
| E30 | 0.8 | Good | Fair | 0.8 | 2.8 | 3.1 | 0.3 | Very Good | Very Good | Good | Good | Inventive Example |
| E31 | 2 | Good | Good | 0.8 | 2.8 | 3.0 | 0.2 | Very Good | Very Good | Very Good | Good | Inventive Example |
| E32 | 5 | Good | Very Good | 0.8 | 2.7 | 3.0 | 0.3 | Very Good | Very Good | Very Good | Good | Inventive Example |
| E33 | 8 | Good | Very Good | 0.7 | 2.8 | 3.2 | 0.4 | Very Good | Very Good | Very Good | Good | Inventive Example |
| E34 | 12 | Good | Very Good | 0.7 | 2.8 | 3.1 | 0.3 | Very Good | Good | Very Good | Good | Inventive Example |

TABLE 12-continued

| | Film | | | | Evaluation | | | | | | |
| --- | --- | --- | --- | --- | --- | --- | --- | --- | --- | --- | --- |
| | | Positional | | | Discoloration resistance at the time of heating | | | | | | |
| | Zr | relationship | Element | | Color difference b* | | | | | Corrosion | |
| No. | adhesion amount (mg/m²) | between depth position A and depth position B | concentration of Zr at depth position A | α/β | Initial | After elapse of time | Δb* | Coating film adhesion | Sulfide staining resistance | resistance after coating | Remark |
| E35 | 16 | Good | Very Good | 0.8 | 2.9 | 3.2 | 0.3 | Very Good | Good | Very Good | Good | Inventive Example |

TABLE 13

| | Film | | | | Evaluation | | | | | | |
| --- | --- | --- | --- | --- | --- | --- | --- | --- | --- | --- | --- |
| | | Positional | | | Discoloration resistance at the time of heating | | | | | | |
| | Zr | relationship | Element | | Color difference b* | | | | | Corrosion | |
| No. | adhesion amount (mg/m²) | between depth position A and depth position B | concentration of Zr at depth position A | α/β | Initial | After elapse of time | Δb* | Coating film adhesion | Sulfide staining resistance | resistance after coating | Remark |
| E36 | 23 | Good | Very Good | 0.7 | 3.1 | 3.3 | 0.2 | Very Good | Good | Very Good | Good | Inventive Example |
| E37 | 35 | Good | Very Good | 0.9 | 2.9 | 4.3 | 1.4 | Good | Good | Good | Fair | Inventive Example |
| E38 | 48 | Good | Very Good | 0.9 | 3.1 | 5.5 | 2.4 | Fair | Good | Good | Fair | Inventive Example |
| E39 | 2 | Good | Good | 0.6 | 2.4 | 2.6 | 0.2 | Very Good | Very Good | Very Good | Good | Inventive Example |
| E40 | 6 | Good | Good | 0.6 | 2.5 | 2.8 | 0.3 | Very Good | Very Good | Very Good | Good | Inventive Example |
| E41 | 8 | Good | Good | 0.6 | 2.8 | 3.2 | 0.4 | Very Good | Very Good | Very Good | Good | Inventive Example |
| E42 | 10 | Good | Good | 0.6 | 2.9 | 3.2 | 0.3 | Very Good | Very Good | Very Good | Good | Inventive Example |
| E43 | 23 | Good | Very Good | 0.6 | 3.3 | 3.5 | 0.2 | Very Good | Good | Good | Good | Inventive Example |
| E44 | 20 | Good | Very Good | 0.7 | 3.2 | 3.5 | 0.3 | Very Good | Very Good | Good | Good | Inventive Example |
| E45 | 4 | Good | Good | 0.7 | 2.8 | 3.6 | 0.8 | Very Good | Very Good | Very Good | Good | Inventive Example |
| E46 | 3 | Good | Good | 0.7 | 2.5 | 3.6 | 1.1 | Good | Very Good | Very Good | Good | Inventive Example |
| E47 | 0.5 | Good | Fair | 0.6 | 2.4 | 3.9 | 1.5 | Good | Very Good | Very Good | Good | Inventive Example |
| E48 | 0.3 | Good | Good | 0.7 | 2.1 | 2.5 | 0.4 | Very Good | Very Good | Good | Fair | Inventive Example |
| E49 | 4 | Good | Very Good | 0.7 | 2.3 | 2.8 | 0.5 | Very Good | Very Good | Very Good | Good | Inventive Example |
| E50 | 5 | Good | Very Good | 0.6 | 2.6 | 3.0 | 0.4 | Very Good | Very Good | Very Good | Good | Inventive Example |
| E51 | 6 | Good | Very Good | 1.4 | 2.6 | 3.9 | 1.3 | Good | Good | Very Good | Good | Inventive Example |
| E52 | 3 | Good | Very Good | 0.7 | 2.4 | 2.7 | 0.3 | Very Good | Good | Good | Fair | Inventive Example |
| E53 | 2 | Good | Very Good | 0.7 | 2.5 | 2.9 | 0.4 | Very Good | Very Good | Good | Good | Inventive Example |
| E54 | 7 | Good | Very Good | 0.6 | 2.6 | 2.9 | 0.3 | Very Good | Very Good | Good | Good | Inventive Example |
| E55 | 9 | Good | Very Good | 0.7 | 2.5 | 2.9 | 0.4 | Very Good | Very Good | Good | Fair | Inventive Example |
| E56 | 6 | Good | Very Good | 0.6 | 2.7 | 3.1 | 0.4 | Very Good | Very Good | Very Good | Good | Inventive Example |
| E57 | 5 | Good | Very Good | 0.6 | 2.7 | 3.2 | 0.5 | Very Good | Very Good | Very Good | Good | Inventive Example |
| E58 | 6 | Good | Very Good | 0.5 | 2.7 | 4.0 | 1.3 | Good | Good | Very Good | Good | Inventive Example |
| E59 | 3 | Good | Very Good | 0.6 | 2.6 | 4.0 | 1.4 | Good | Very Good | Very Good | Good | Inventive Example |

TABLE 13-continued

| | Film | | | | Evaluation | | | | | | |
|---|---|---|---|---|---|---|---|---|---|---|---|
| | | Positional | | | Discoloration resistance at the time of heating | | | | | | |
| | Zr | relationship | Element | | Color difference b* | | | | | Corrosion | |
| No. | adhesion amount (mg/m$^2$) | between depth position A and depth position B | concentration of Zr at depth position A | α/β | Initial | After elapse of time | Δb* | Coating film adhesion | Sulfide staining resistance | resistance after coating | Remark |
| E60 | 5 | Good | Very Good | 0.7 | 2.7 | 3.2 | 0.5 | Very Good | Very Good | Very Good | Good | Inventive Example |
| E61 | 5 | Good | Very Good | 0.6 | 2.7 | 3.1 | 0.4 | Very Good | Very Good | Very Good | Good | Inventive Example |
| E62 | 3 | Good | Very Good | 0.7 | 2.7 | 4.0 | 1.3 | Good | Very Good | Very Good | Good | Inventive Example |
| E63 | 4 | Good | Very Good | 0.6 | 2.8 | 3.2 | 0.4 | Very Good | Very Good | Very Good | Good | Inventive Example |
| E64 | 4 | Good | Very Good | 0.7 | 2.6 | 2.9 | 0.3 | Very Good | Very Good | Very Good | Good | Inventive Example |
| E65 | 4 | Good | Very Good | 0.5 | 2.7 | 3.1 | 0.4 | Very Good | Very Good | Very Good | Good | Inventive Example |
| E66 | 5 | Good | Very Good | 0.7 | 2.7 | 3.1 | 0.4 | Very Good | Very Good | Very Good | Good | Inventive Example |
| E67 | 5 | Good | Very Good | 0.7 | 2.8 | 3.0 | 0.2 | Very Good | Very Good | Very Good | Good | Inventive Example |
| E68 | 4 | Good | Very Good | 0.7 | 2.7 | 3.1 | 0.4 | Very Good | Very Good | Very Good | Good | Inventive Example |
| E69 | 4 | Good | Very Good | 0.7 | 2.7 | 3.1 | 0.4 | Very Good | Very Good | Very Good | Good | Inventive Example |
| E70 | 5 | Good | Very Good | 0.8 | 2.9 | 3.1 | 0.2 | Very Good | Very Good | Very Good | Good | Inventive Example |

TABLE 14

| | Film | | | | Evaluation | | | | | | |
|---|---|---|---|---|---|---|---|---|---|---|---|
| | | Positional | | | Discoloration resistance at the time of heating | | | | | | |
| | Zr | relationship | Element | | Color difference b* | | | | | Corrosion | |
| No. | adhesion amount (mg/m$^2$) | between depth position A and depth position B | concentration of Zr at depth position A | α/β | Initial | After elapse of time | Δb* | Coating film adhesion | Sulfide staining resistance | resistance after coating | Remark |
| E71 | 5 | Good | Very Good | 0.7 | 2.8 | 3.2 | 0.4 | Very Good | Very Good | Very Good | Good | Inventive Example |
| E72 | 4 | Good | Very Good | 0.8 | 2.6 | 2.9 | 0.3 | Very Good | Very Good | Very Good | Good | Inventive Example |
| E73 | 3 | Good | Very Good | 1.7 | 2.8 | 4.0 | 1.2 | Good | Very Good | Very Good | Good | Inventive Example |
| E74 | 3 | Good | Very Good | 1.6 | 2.9 | 4.0 | 1.1 | Good | Very Good | Very Good | Good | Inventive Example |
| E75 | 5 | Good | Very Good | 0.6 | 2.9 | 3.2 | 0.3 | Very Good | Very Good | Very Good | Good | Inventive Example |
| E76 | 5 | Good | Very Good | 0.7 | 2.8 | 3.3 | 0.5 | Very Good | Very Good | Very Good | Good | Inventive Example |
| E77 | 5 | Good | Very Good | 0.8 | 2.8 | 3.1 | 0.3 | Very Good | Very Good | Very Good | Good | Inventive Example |
| E78 | 5 | Good | Very Good | 0.7 | 2.9 | 3.4 | 0.5 | Very Good | Very Good | Very Good | Good | Inventive Example |
| E79 | 4 | Good | Very Good | 0.6 | 2.6 | 3.0 | 0.4 | Very Good | Very Good | Very Good | Good | Inventive Example |
| E80 | 4 | Good | Very Good | 0.7 | 2.8 | 3.2 | 0.4 | Very Good | Very Good | Very Good | Good | Inventive Example |
| E81 | 5 | Good | Very Good | 0.7 | 2.8 | 3.3 | 0.5 | Very Good | Very Good | Very Good | Good | Inventive Example |
| E82 | 4 | Good | Fair | 0.6 | 2.6 | 5.5 | 2.9 | Fair | Very Good | Good | Good | Inventive Example |
| E83 | 5 | Good | Good | 0.6 | 2.6 | 4.4 | 1.8 | Good | Very Good | Good | Good | Inventive Example |
| E84 | 4 | Good | Very Good | 0.7 | 2.7 | 3.5 | 0.8 | Very Good | Very Good | Very Good | Good | Inventive Example |

TABLE 14-continued

| | Film | | | | Evaluation | | | | | | | |
| | | | | | Discoloration resistance at the time of heating | | | | | | | |
| | | Positional | | | Color difference b* | | | | | | | |
| | Zr | relationship | Element | | | | | | | | | |
| No. | adhesion amount (mg/m$^2$) | between depth position A and depth position B | concentration of Zr at depth position A | α/β | Initial | After elapse of time | Δb* | | Coating film adhesion | Sulfide staining resistance | Corrosion resistance after coating | Remark |
|---|---|---|---|---|---|---|---|---|---|---|---|---|
| E85 | 5 | Good | Very Good | 0.7 | 2.8 | 3.3 | 0.5 | Very Good | Very Good | Very Good | Good | Inventive Example |
| E86 | 5 | Good | Very Good | 0.8 | 2.8 | 3.3 | 0.5 | Very Good | Very Good | Very Good | Good | Inventive Example |
| E87 | 5 | Good | Very Good | 0.7 | 2.7 | 3.1 | 0.4 | Very Good | Very Good | Very Good | Good | Inventive Example |
| E88 | 4 | Good | Very Good | 0.7 | 2.8 | 3.1 | 0.3 | Very Good | Good | Very Good | Good | Inventive Example |
| E89 | 3 | Good | Very Good | 0.8 | 2.7 | 2.9 | 0.2 | Very Good | Good | Very Good | Good | Inventive Example |
| E90 | 3 | Good | Very Good | 0.8 | 3.3 | 5.7 | 2.4 | Fair | Very Good | Good | Good | Inventive Example |
| E91 | 3 | Good | Very Good | 0.7 | 3.2 | 4.8 | 1.6 | Good | Very Good | Very Good | Good | Inventive Example |
| E92 | 3 | Good | Very Good | 0.8 | 3.4 | 3.9 | 0.5 | Very Good | Very Good | Very Good | Good | Inventive Example |
| E93 | 3 | Good | Very Good | 0.8 | 3.3 | 3.3 | | Very Good | Good | Very Good | Good | Inventive Example |
| E94 | 5 | Good | Very Good | 0.7 | 2.9 | 5.1 | 2.2 | Fair | Very Good | Very Good | Good | Inventive Example |
| E95 | 4 | Good | Very Good | 0.7 | 2.8 | 4.3 | 1.5 | Good | Very Good | Very Good | Good | Inventive Example |
| E96 | 4 | Good | Very Good | 0.8 | 2.9 | 3.3 | 0.4 | Very Good | Very Good | Very Good | Good | Inventive Example |
| E97 | 5 | Good | Very Good | 0.7 | 2.9 | 3.3 | 0.4 | Very Good | Very Good | Very Good | Good | Inventive Example |
| E98 | 5 | Good | Very Good | 0.7 | 2.8 | 3.1 | 0.3 | Very Good | Very Good | Very Good | Good | Inventive Example |
| E99 | 4 | Good | Very Good | 0.8 | 2.9 | 3.3 | 0.4 | Very Good | Very Good | Very Good | Good | Inventive Example |
| E100 | 4 | Good | Very Good | 0.7 | 2.8 | 3.2 | 0.4 | Very Good | Very Good | Very Good | Good | Inventive Example |
| e1 | 5 | Bad | Very Good | 0.5 | 2.7 | 5.8 | 3.1 | Bad | Very Good | Very Good | Good | Comparative Example |
| e2 | 4 | Bad | Very Good | 0.2 | 3.1 | 11.9 | 8.8 | Bad | Good | Good | Fair | Comparative Example |
| e3 | 5 | Bad | Very Good | 0.3 | 4.5 | 14.0 | 9.5 | Bad | Very Good | Good | Good | Comparative Example |
| e4 | 0.1 | Bad | Fair | 1.2 | 2.8 | 9.6 | 6.8 | Bad | Good | Bad | Bad | Comparative Example |
| e5 | 55 | Bad | Very Good | 0.2 | 5.6 | 15.4 | 9.8 | Bad | Bad | Very Good | Good | Comparative Example |

As is clear from Tables 12 to 14, in Inventive Examples, all evaluation results were good. On the other hand, in Comparative Examples e1 to e5, the discoloration resistance at the time of heating deteriorated.

Example 6

Tables 15 and 16 show the results in a case where the Zr ion concentration in the anodic electrolytic treatment solution is changed. Table 15 shows the manufacturing conditions, and Table 16 shows the configurations and the evaluation results of the obtained Sn-plated steel sheets.

TABLE 15

| | Sn plating | | Cathodic electrolytic treatment | | | | | | | | | |
| | | | Composition of electrolytic bath | | | Electrolysis conditions | | | | Cleaning treatment | | |
| No. | Sn one surface adhesion amount (g/m²) | Heating and melting | Zr ions (ppm) | Phosphate ions (ppm) | Other ions (50 ppm added) | Current density (A/dm²) | Flow velocity (m/min) | pH | Bath temperature (° C.) | Treatment temperature (° C.) | Treatment time (seconds) | pH |
|---|---|---|---|---|---|---|---|---|---|---|---|---|
| F1 | 2.8 | Performed | 1400 | 900 | None | 3.0 | 200 | 4.0 | 35 | 30 | 0.9 | 6 |
| F2 | 2.8 | Performed | 1400 | 900 | None | 3.0 | 200 | 4.0 | 35 | 30 | 0.9 | 6 |
| F3 | 2.8 | Performed | 1400 | 900 | None | 3.0 | 200 | 4.0 | 35 | 30 | 0.9 | 6 |
| f1 | 2.8 | Performed | 1400 | 900 | None | 3.0 | 200 | 4.0 | 35 | 30 | 0.9 | 6 |
| f2 | 2.8 | Performed | 1400 | 900 | None | 3.0 | 200 | 4.0 | 35 | 30 | 0.9 | 6 |

| | Anodic electrolytic condition | | | | | | | |
| | Composition of electrolytic bath | | | | Electrolysis conditions | | | |
| No. | Kind of electrolyte | Zr ion concentration (ppm) | pH | Electrical conductivity (S/m) | Amount of electricity (C/dm²) | Current density (A/dm²) | Bath temperature (° C.) | Remark |
|---|---|---|---|---|---|---|---|---|
| F1 | Sodium hydrogen carbonate | 10 | 8 | 2.0 | 0.5 | 0.56 | 25 | Inventive Example |
| F2 | Sodium hydrogen carbonate | 150 | 8 | 2.0 | 0.5 | 0.56 | 25 | Inventive Example |
| F3 | Sodium hydrogen carbonate | 260 | 8 | 2.0 | 0.5 | 0.56 | 25 | Inventive Example |
| f1 | Sodium hydrogen carbonate | 280 | 8 | 2.0 | 0.5 | 0.56 | 25 | Comparative Example |
| f2 | Sodium hydrogen carbonate | 500 | 8 | 2.0 | 0.5 | 0.56 | 25 | Comparative Example |

TABLE 16

| | Sn plating | | Film layer | | | | Performance Discoloration resistance at the time of heating Color difference b* | |
| No. | Sn one surface adhesion amount (g/m²) | Heating and melting | Zr adhesion amount (mg/m²) | Positional relationship between depth position A and depth position B | Element concentration of Zr at depth position A | α/β | Initial | After elapse of time |
|---|---|---|---|---|---|---|---|---|
| F1 | 2.8 | Performed | 4 | Good | Very Good | 0.8 | 2.2 | 2.6 |
| F2 | 2.8 | Performed | 4 | Good | Very Good | 0.8 | 2.1 | 3.6 |
| F3 | 2.8 | Performed | 5 | Good | Very Good | 0.8 | 2.8 | 5.4 |
| f1 | 2.8 | Performed | 5 | Bad | Very Good | 0.8 | 2.9 | 6.1 |
| f2 | 2.8 | Performed | 4 | Bad | Very Good | 0.8 | 3.2 | 6.8 |

| | Performance | | | | |
| | Discoloration resistance at the time of heating Color difference b* Δb* | Coating film adhesion | Sulfide staining resistance | Corrosion resistance after coating | Remark |
| No. | | | | | |
|---|---|---|---|---|---|
| F1 | 0.4 | Very Good | Good | Good | Inventive Example |
| F2 | 1.5 | Good | Good | Good | Inventive Example |
| F3 | 2.6 | Fair | Good | Good | Inventive Example |

TABLE 16-continued

| | | | | | | |
|---|---|---|---|---|---|---|
| f1 | 3.2 | Bad | Good | Good | Good | Comparative Example |
| f2 | 3.6 | Bad | Good | Good | Good | Comparative Example |

As is clear from Tables 15 and 16, in Inventive Examples, all the evaluation results were good. On the other hand, in Comparative Examples f1 and f2, the discoloration resistance at the time of heating deteriorated.

Although the preferable embodiments of the present invention have been described above in detail, the present invention is not limited to these examples. It is apparent that a person having common knowledge in the technical field to which the present invention belongs is able to devise various variation or modification examples within the range of technical ideas of the present invention, and it should be understood that they also belong to the technical scope of the present invention as a matter of course.

INDUSTRIAL APPLICABILITY

As described above, the Sn-plated steel sheet having the film including zirconium oxide and tin oxide on the surface of the Sn-plated steel sheet, in which the adhesion amount of the zirconium oxide is 0.2 mg/m² to 50 mg/m² in terms of metal Zr amount, in the XPS depth direction analysis, the depth position A at which the element concentration of Zr present as the zirconium oxide is maximum is positioned closer to the surface of the film than the depth position B at which the element concentration of Sn present as the tin oxide is maximum, and the distance between the depth position A and the depth position B in the depth direction is 0.5 nm or more has excellent discoloration resistance at the time of heating, coating film adhesion, and sulfide staining resistance without requiring a chromate treatment of the related art. From this, the steel sheet can be widely used for food cans, beverage cans, and the like as an environmentally friendly can material, and the industrial value is extremely high.

BRIEF DESCRIPTION OF THE REFERENCE SYMBOLS

10: steel sheet
20: Sn-plated layer
30: film
100: Sn-plated steel sheet

The invention claimed is:

1. A Sn-plated steel sheet comprising:
a steel sheet;
a Sn-plated layer that is provided on at least one surface of the steel sheet; and
a film that is provided on a surface of the Sn-plated layer and includes zirconium oxide and tin oxide,
wherein an amount of the zirconium oxide in the film is 0.2 mg/m² to 50 mg/m² in terms of metal Zr amount,
in a depth direction analysis by X-ray photoelectron spectroscopy, a depth position A at which an element concentration of Zr present as the zirconium oxide is maximum is positioned closer to a surface of the film than a depth position B at which an element concentration of Sn present as the tin oxide is maximum, and a distance between the depth position A and the depth position B in a depth direction is 0.5 nm or more, and the tin oxide exists on the outermost surface of the film.

2. The Sn-plated steel sheet according to claim 1, wherein, in the depth direction element analysis by the X-ray photoelectron spectroscopy, the element concentration of Zr present as the zirconium oxide at the depth position A is 20% or more.

3. The Sn-plated steel sheet according to claim 1, wherein the film further includes a phosphate compound, and
in the film, a value $\alpha/\beta$ obtained by dividing an amount $\alpha$(unit: mg/m²) of the phosphate compound in terms of P amount by an amount $\beta$ (unit: mg/m²) of the zirconium oxide in terms of metal Zr amount is 0.2 to 2.0.

4. The Sn-plated steel sheet according to claim 1, wherein, when a depth position ⅓ of a thickness of the film from the surface of the film is set as a depth position C,
the depth position A is positioned closer to the surface than the depth position C.

* * * * *